(12) United States Patent
Kuroda et al.

(10) Patent No.: US 7,505,210 B2
(45) Date of Patent: Mar. 17, 2009

(54) ZOOM LENS AND IMAGING DEVICE

(75) Inventors: Daisuke Kuroda, Kanagawa (JP); Yoshito Iwasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 10/549,919

(22) PCT Filed: Dec. 24, 2004

(86) PCT No.: PCT/JP2004/019777

§ 371 (c)(1),
(2), (4) Date: Sep. 20, 2005

(87) PCT Pub. No.: WO2005/073774

PCT Pub. Date: Aug. 11, 2005

(65) Prior Publication Data

US 2007/0008418 A1    Jan. 11, 2007

(30) Foreign Application Priority Data

Jan. 28, 2004    (JP) .............................. 2004-019964

(51) Int. Cl.
*G02B 15/14* (2006.01)
(52) U.S. Cl. .................. 359/676; 359/678; 359/683
(58) Field of Classification Search ................. 359/676, 359/678
See application file for complete search history.

(56) References Cited

U.S. PATENT DOCUMENTS 5,847,882 A * 12/1998 Nakayama ................. 359/684

2005/0275735 A1 * 12/2005 Nanjo ..................... 348/240.3
2006/0158742 A1 * 7/2006 Mihara ...................... 359/676

FOREIGN PATENT DOCUMENTS

| JP | 09-133864 | 5/1997 |
|---|---|---|
| JP | 11-101941 | 4/1999 |
| JP | 11-133303 | 5/1999 |
| JP | 2000-131610 | 5/2000 |
| JP | 2000-147379 | 5/2000 |
| JP | 2001-356270 | 12/2001 |
| JP | 2003-202500 | 7/2003 |
| JP | 2003-302576 | 10/2003 |
| JP | 2003-329930 | 11/2003 |

* cited by examiner

*Primary Examiner*—Jordan M. Schwartz
(74) *Attorney, Agent, or Firm*—Oblon, Spivak, McClelland, Maier & Neustadt, P.C.

(57) ABSTRACT

A zoom lens has good optical performance, is compact, and has a high magnifying power, and is suitable for use in a video camera, a digital still camera, a cellular phone, or the like, and an image pickup apparatus employs the zoom lens. The zoom lens includes a first lens group fixed upon zooming and having a positive refractive power, a second lens group having a negative refractive power, a third lens group having a positive refractive power, a fourth lens group having a negative refractive power, and a fifth lens group having a positive refractive power, which are successively arranged in the order from the object side. At least the second lens group and the fourth lens group are moved for zooming.

11 Claims, 17 Drawing Sheets

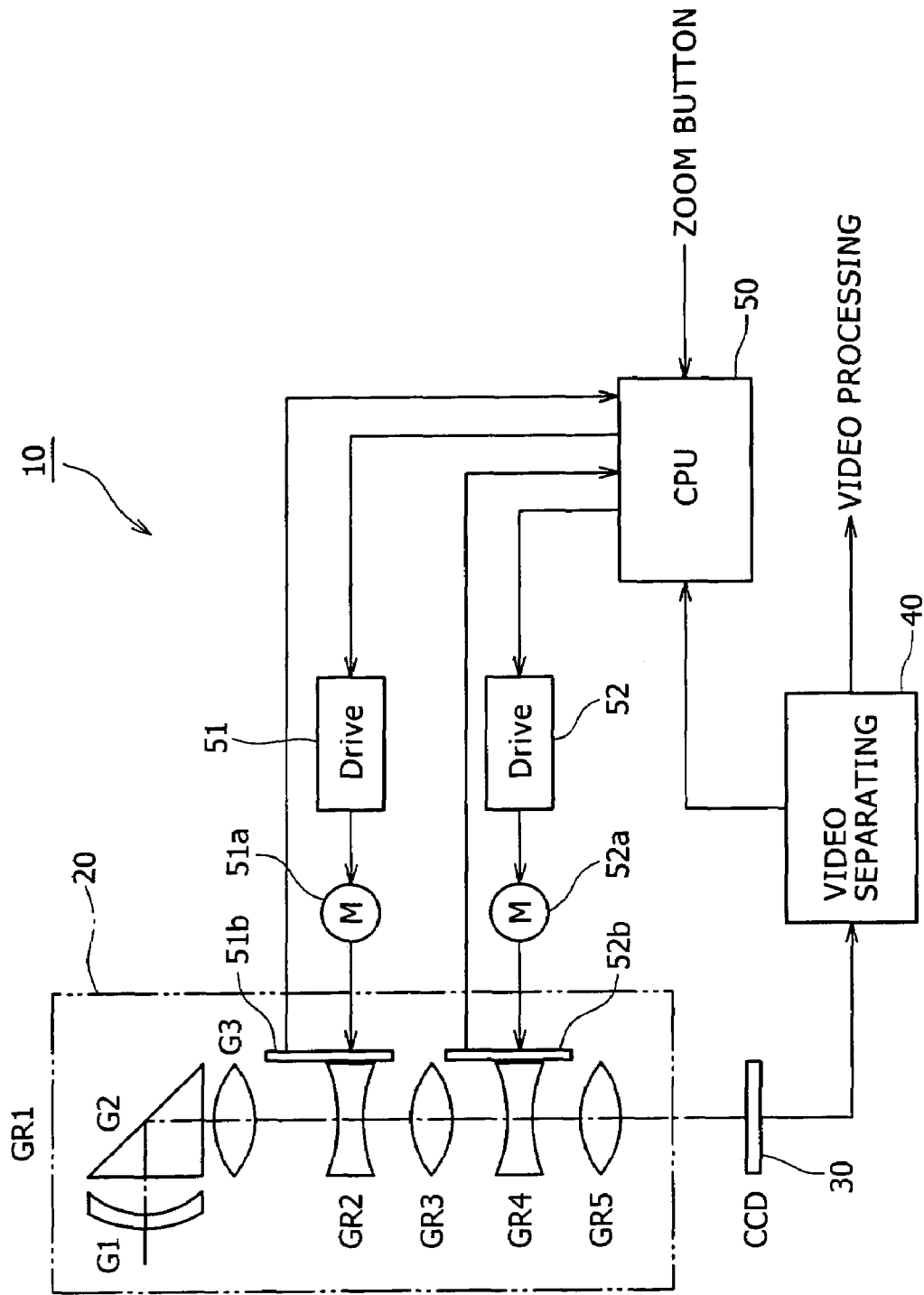

ZOOM LENS AND IMAGING DEVICE

TECHNICAL FIELD

The present invention relates to a novel zoom lens and image pickup apparatus. More specifically, the present invention is concerned with a zoom lens which is compact and has a high variable magnifying power, suitable for use in the imaging optical system of a digital input/output device such as a digital still camera, a digital video camera, a digital camera incorporated in a cellular phone, or the like, and an image pickup apparatus employing such a zoom lens.

BACKGROUND ART

In recent years, video cameras and digital still cameras employing solid-state imaging device such as CCDs (Charged Coupled Devices) and CMOS (Complementary Metal-Oxide Semiconductor) devices have been in widespread use. Such image pickup apparatus are required to achieve a higher image quality. In particular, digital still cameras with a large number of pixels need imaging lenses having an excellent focusing capability compatible with solid-state imaging devices with a large number of pixels, especially zoom lenses having a high variable magnifying power. In addition, low-profile zoom lenses are particularly needed to meet strong demands for smaller image sensing devices.

In view of the above needs, zoom lenses disclosed in Japanese Patent Laid-open No. Hei 8-248318 and Japanese Patent Laid-open No. 2000-131610 are designed to reduce the size of a front lens in the direction of the optical axis, i.e., to achieve a low-profile lens design, by inserting a prism in an optical system.

However, the zoom lenses disclosed in Japanese Patent Laid-open No. Hei 8-248318 and Japanese Patent Laid-open No. 2000-131610 are problematic in that it is difficult for the zoom lenses to have a higher magnifying power because the higher magnifying power tends to result in greater aberration changes when the magnifying power varies. Furthermore, even if the zoom lenses have a higher magnifying power, since the movable lens groups have a positive refractive power, the movable lens groups have a large mechanism, which makes it difficult to make the zoom lenses lower in profile. Specifically, the zoom lenses disclosed in Japanese Patent Laid-open No. Hei 8-248318 and Japanese Patent Laid-open No. 2000-131610 have second and fourth lens groups movable for zooming. Inasmuch as the fourth lens group of each of the zoom lenses has a positive refractive power, the movable lens groups include the lens group having a positive refractive power, making it difficult to make the zoom lens smaller.

The present invention has been made in view of the above problems. It is an object of the present invention to provide a zoom lens which has good optical performance, is compact, and has a high magnifying power, and which is suitable for use in a video camera, a digital still camera, a cellular phone, or the like, and an image pickup apparatus employing the zoom lens.

DISCLOSURE OF INVENTION

To achieve the above object, a zoom lens according to the present invention has a first lens group fixed upon zooming and having a positive refractive power, a second lens group having a negative refractive power, a third lens group having a positive refractive power, a fourth lens group having a negative refractive power, and a fifth lens group having a positive refractive power, which are successively arranged in the order from the object side, wherein at least the second lens group and the fourth lens group are moved for zooming, wherein the first lens group includes a first single lens having a negative refractive power, a reflective member for bending an optical path through 90°, and at least one second lens having a positive refractive power, which are successively arranged in the order from the object side.

To achieve the above object, an image pickup apparatus according to the present invention includes a zoom lens having a plurality of lens groups, for varying a magnifying power by changing distances between the lens groups, and an image sensing device for converting an optical image generated by the zoom lens into an electric signal, wherein the zoom lens includes a first lens group fixed upon zooming and having a positive refractive power, a second lens group having a negative refractive power, a third lens group having a positive refractive power, a fourth lens group having a negative refractive power, and a fifth lens group having a positive refractive power, which are successively arranged in the order from the object side, wherein at least the second lens group and the fourth lens group are moved for zooming, and wherein the first lens group includes a first single lens having a negative refractive power, a reflective member for bending an optical path through 90°, and at least one second lens having a positive refractive power, which are successively arranged in the order from the object side.

According to the present invention, therefore, the size of the entire lens system in the direction of the optical axis of incident light applied to the first lens (front lens) of the first lens group is reduced (is made lower in profile), so that the zoom lens can have a lower profile and a higher magnifying power while suppressing aberration variations.

A zoom lens according to the present invention has a first lens group fixed upon zooming and having a positive refractive power, a second lens group having a negative refractive power, a third lens group having a positive refractive power, a fourth lens group having a negative refractive power, and a fifth lens group having a positive refractive power, which are successively arranged in the order from the object side, wherein at least the second lens group and the fourth lens group are moved for zooming, wherein the first lens group includes a first single lens having a negative refractive power, a reflective member for bending an optical path through 90°, and at least one second lens having a positive refractive power, which are successively arranged in the order from the object side.

An image pickup apparatus according to the present invention includes a zoom lens having a plurality of lens groups, for varying a magnifying power by changing distances between the lens groups, and an image sensing device for converting an optical image generated by the zoom lens into an electric signal, wherein the zoom lens includes a first lens group fixed upon zooming and having a positive refractive power, a second lens group having a negative refractive power, a third lens group having a positive refractive power, a fourth lens group having a negative refractive power, and a fifth lens group having a positive refractive power, which are successively arranged in the order from the object side, wherein at least the second lens group and the fourth lens group are moved for zooming, and wherein the first lens group includes a first single lens having a negative refractive power, a reflective member for bending an optical path through 90°, and at least one second lens having a positive refractive power, which are successively arranged in the order from the object side.

According to the present invention, therefore, since the first lens group includes a first single lens having a negative refractive power, a reflective member such as a right-angle prism for bending an optical path through 90°, and at least one second lens having a positive refractive power, the size of the entire lens system in the direction of the optical axis of incident light applied to the first lens (front lens) of the first lens group is reduced (is made lower in profile) as much as possible. Furthermore, because the second lens group having the negative refractive power is disposed immediately after the first lens group having the positive refractive power, the position of the entrance pupil of the entire lens system is made closer to the object side, making it possible to reduce the size of the reflective member for making the first lens group lower in profile. Moreover, since each of the second lens group and the fourth lens group that are movable has a negative refractive power, the movable lens groups can be reduced in size, aberration changes upon zooming can be suppressed, and the zoom lens can have a lower profile and a higher magnifying power at the same time.

According to the present invention, the zoom lens satisfies the conditional formula (1) 1.0<D1/Fw<5.0 and the conditional formula (2) 0.1<D1/Ft<1.0 where D1 represents the entire lens length of the first lens group, Fw the focal length of the entire lens system at a wide-angle end state, and Ft the focal length of the entire lens system at a telescopic end state. Therefore, the zoom lens can be reduced in size, and can well correct curvature of field and coma.

According to the present invention, the zoom lens satisfies the conditional formula (3) NdL1>1.75 and the conditional formula (4) VdAv−VdL1>15 where NdL1 represents the refractive index of the first lens at the d-line, VdL1 the Abbe number of the first lens at the d-line, and VdAv the average of the Abbe numbers of the lenses having a positive refractive power subsequent to the second lens in the first lens group (VdAv is determined by (ΣVdLi)/i where i represents the number of lenses having a positive refractive power subsequent to the second lens). Therefore, the zoom lens can well correct chromatic aberration, and can have a lower profile and a higher magnifying power at the same time.

According to the present invention, the third lens group has an iris aperture and is fixed upon zooming. Consequently, there is no need for an actuating device, and hence there is no obstacle to efforts to make the zoom lens smaller in size.

BRIEF DESCRIPTION OF DRAWINGS

FIG. 17 is a block diagram of a central portion of an image pickup apparatus according to an embodiment of the present invention.

BEST MODE FOR CARRYING OUT THE INVENTION

Figure 1:
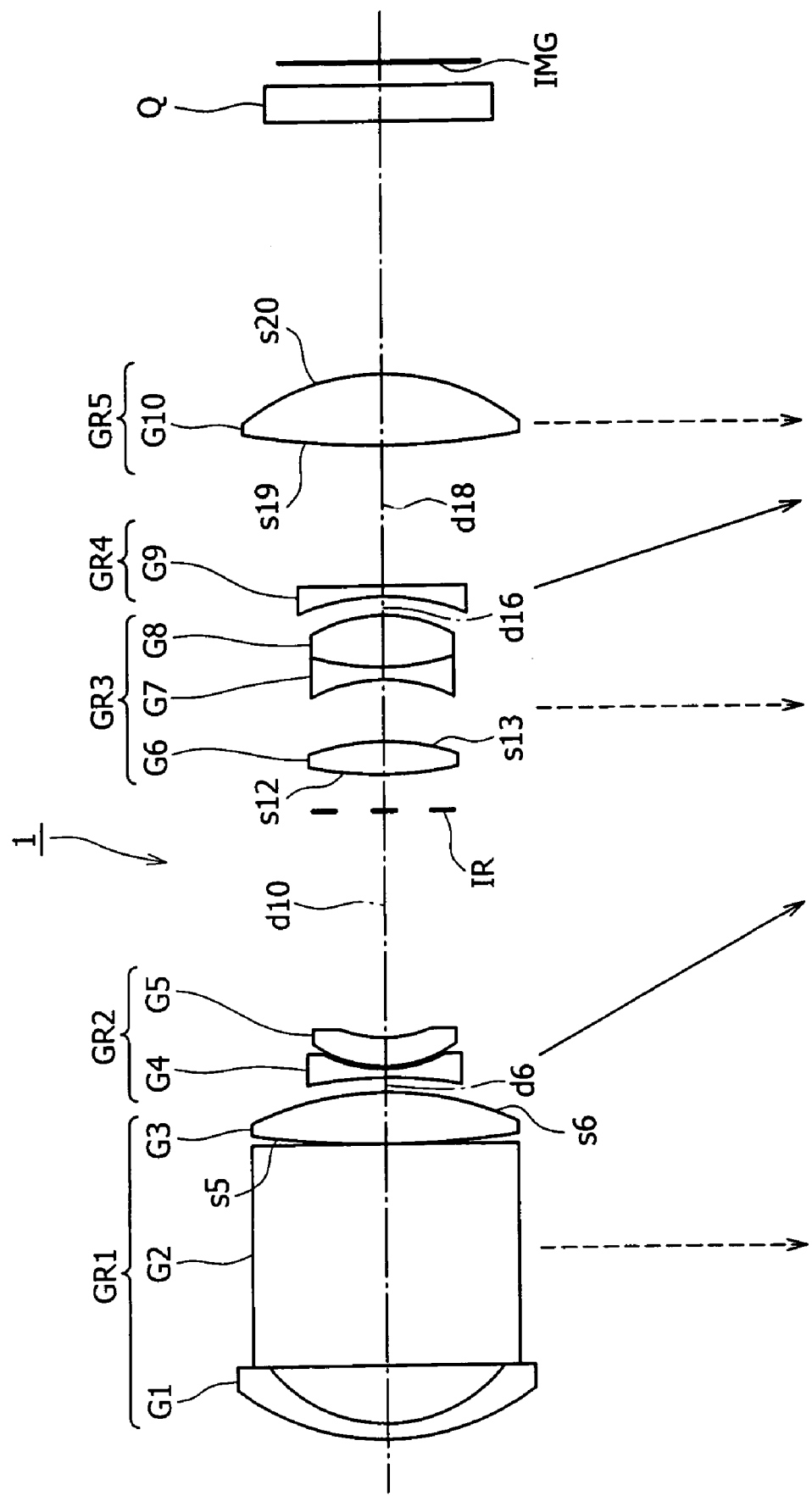
FIG. 1, together with FIGS. 2 through 4, shows a zoom lens according to a first embodiment of the present invention, FIG. 1 being a schematic view showing a lens arrangement.

Best modes for carrying out the invention will be described below with reference to the accompanying drawings.

A zoom lens according to the present invention includes a first lens group GR1 fixed upon zooming and having a positive refractive power, a second lens group GR2 having a negative refractive power, a third lens group GR3 having a positive refractive power, a fourth lens group GR4 having a negative refractive power, and a fifth lens group GR5 having a positive refractive power, which are successively arranged in the order from the object side. At least the second lens group GR2 and the fourth lens group GR4 are moved for zooming. Since each of the second lens group GR2 and the fourth lens group GR4 that are movable for zooming has a negative refractive power, the movable lens groups can be reduced in size, aberration changes upon zooming can be suppressed, and the zoom lens can have a lower profile and a higher magnifying power at the same time.

The first lens group GR1 includes a first single lens having a negative refractive power, a reflective member for bending an optical path through 90°, and at least one second lens having a positive refractive power, which are successively arranged in the order from the object side. Though the reflective member preferably includes a right-angle prism, it may be another reflective member such as a plane mirror, for example. As described above, the first lens group GR1 includes the first single lens having the negative refractive power, the reflective member, such as a right-angle prism, for bending the optical path through 90°, and at least one second lens having the positive refractive power. Therefore, the size of the entire lens system in the direction of the optical axis of incident light applied to the first lens (front lens) of the first lens group G1 is reduced (is made lower in profile) as much as possible. The second lens group GR2 having the negative refractive power is disposed immediately behind the first lens group GR1 having the positive refractive power. Therefore, the position of the entrance pupil of the entire lens system is made closer to the object side, making it possible to reduce the size of the reflective member for making the first lens group GR1 lower in profile.

The zoom lens according to the present invention should preferably satisfy the following conditional formulas (1), (2):

$$1.0<D1/Fw<5.0; \text{ and} \quad (1)$$

$$0.1<D1/Ft<1.0 \quad (2)$$

where D1 represents the entire lens length of the first lens group, Fw the focal length of the entire lens system at a wide-angle end state, and Ft the focal length of the entire lens system at a telescopic end state.

The conditional formula (1) prescribes the ratio of the entire lens length of the first lens group GR1 to the focal length of the entire lens system at the wide-angle end state. If the value of D1/Fw is equal to or less than 1.0, then though the size of the reflective member itself which is used in the first lens group GR1 is reduced, making the zoom lens lower in profile, the power of the first lens having the negative refractive power in the first lens group GR1 is too strong, making it very difficult to correct the curvature of field and coma. If the value of D1/Fw is equal to or greater than 5.0, then the reflective member is too large to make the zoom lens smaller in size.

The conditional formula (2) prescribes the ratio of the entire lens length of the first lens group GR1 to the focal length of the entire lens system at the telescopic end state. If the value of D1/Ft is equal to or less than 0.1, then though the size of the reflective member itself which is used in the first lens group GR1 is reduced, making the zoom lens lower in profile, the power of the first lens having the negative refractive power in the first lens group GR1 is too strong, making it very difficult to correct the curvature of field and coma, or making the f-number larger at the telescopic end state. If the value of D1/Ft is equal to or greater than 1.0, then the reflective member is too large, making it difficult to make the zoom lens smaller in size.

The zoom lens according to the present invention should preferably satisfy the following conditional formulas (3), (4):

$$NdL1>1.75; \text{ and} \quad (3)$$

$$VdAv-VdL1>15 \quad (4)$$

where NdL1 represents the refractive index of the first lens at the d-line, VdL1 the Abbe number of the first lens at the d-line, and VdAv the average of the Abbe numbers of the lenses having a positive refractive power subsequent to the second lens in the first lens group (VdAv is determined by (ΣVdLi)/i where i represents the number of lenses having a positive refractive power subsequent to the second lens).

The conditional formula (3) prescribes the amount of distortion generated by the first single lens having the negative refractive power in the first lens group GR1 which has the positive refractive power. If the value of NdL1 falls outside of the range given by the conditional formula (3), i.e., is equal to or smaller than 1.75, then the amount of generated distortion is unduly large with respect to the required refractive power of the first lens group GR1, failing to make the zoom lens smaller in size and to give a higher magnifying power to the zoom lens.

The conditional formula (4) prescribes the amount of chromatic aberration generated by the first single lens having the negative refractive power in the first lens group GR1 which has the positive refractive power and the lens groups having a positive refractive power subsequent to the second lens. If the value of VdAv−VdL1 is equal to or smaller than 15, the amount of chromatic aberration generated in the first lens group GR1 having the positive refractive power is so large that it is difficult to correct the chromatic aberration even in the entire lens system.

The first lens group GR1 should desirably be fixed with respect to the image plane when the magnifying power is varied. This is because if the reflective member for bending the optical path includes a right-angle prism, then since the right-angle prism is heavy, it would place a large burden on the actuating mechanism upon movement of the right-angle prism.

The first lens of the first lens group GR1 has a surface s1 on the object side, which should preferably be convex toward the object side. This is because if the surface s1 is concave toward the object side, then it would produce a large negative distortion, and it would be difficult to correct such a large negative distortion in the entire lens system.

The reflective member used in the first lens group GR1 should desirably include a right-angle prism having a high refractive index, e.g., a refractive index in the range from about 1.8 to 1.9. The higher the refractive index, the more effective it is to make the zoom lens smaller in size and to give a higher magnifying power to the zoom lens.

At least one of the surfaces of the lenses of the first lens group GR1 should desirably be aspherical. This is because if none of the surfaces of the lenses of the first lens group GR1 are aspherical, then the distortion at the wide-angle end state and the distortion at the telescopic end state are so large that it is difficult to correct those distortions in the entire lens system.

At least one of the surfaces of the lenses of the third lens group GR3 should desirably be aspherical, or in particular at least one surface of the lens that is positioned mostly closely to the object side should desirably be aspherical. This is because if none of the surfaces of the lenses of the first lens group GR1 are aspherical, then the distortion at the wide-angle end state is so large that it is difficult to correct the distortion in the entire lens system.

Even if the lens groups other than the second lens group GR2 and the fourth lens group GR4 are moved for zooming, the third lens group GR3 and an iris aperture IR should preferably be fixed. Specifically, the third lens group GR3 has a positive refractive power, and if the zoom lens has an actuating device for the iris aperture IR, moving the third lens group GR3 and the iris aperture IR would make an actuating mechanism so large that the entire lens system cannot be made smaller in size.

Zoom lenses according to first through fourth embodiments will be described below, and numerical examples 1 through 4 where specific numerical values are applied to the embodiments will then be described below.

FIG. 1 shows a lens arrangement of a zoom lens according to a first embodiment of the present invention. The zoom lens 1 according to the first embodiment includes a first lens group GR1 having a positive refractive power, a second lens group GR2 having a negative refractive power, a third lens group GR3 having a positive refractive power, a fourth lens group GR4 having a negative refractive power, and a fifth lens group GR5 having a positive refractive power, which are successively arranged in the order from the object side. The first lens group GR1 includes a first lens G1 which is a negative lens, a right-angle prism G2 for bending an optical path through 90°, and a second lens G3, which is a positive lens, having opposite aspherical surfaces. The second lens group GR2 includes a negative lens G4 and a positive lens G5. The third lens group G3 includes a positive lens G6 having opposite aspherical surfaces, and a combined lens assembly including a negative lens G7 and a positive lens G8. The fourth lens group GR4 includes a negative lens G9. The fifth lens group GR5 includes a positive lens G10 having opposite aspherical surfaces. An iris aperture IR which is fixed during zooming is disposed immediately before the third lens group GR3, and a plane glass plate Q corresponding to a filter is interposed between a planned image plane IMG and the fifth lens group GR5.

The second lens group GR2 and the fourth lens group GR4 are movable for zooming. FIG. 1 shows the positions of the lenses at a wide-angle end state. As the focal length is shifted toward a telescopic end state, the lenses move as indicated by the arrows. In FIG. 1, the solid-line arrows indicate that the lenses move for zooming, and the broken-line arrows indicate that the lenses are fixed during zooming. These meanings of the arrows hold true also for FIGS. 5, 9, and 13 to be described later.

Table 1 shows values of the numerical example 1 where specific numerical values are applied to the zoom lens 1 according to the first embodiment. In the present specification, "si" represents the ith surface from the object side, "ri" the ith radius of curvature from the object side, "di" the axial distance between the ith surface and the (i+1)th surface from the object side, "ni" the refractive index at the d-line of a medium having the ith surface from the object side, "vi" the Abbe number of the medium having the ith surface from the object side, "INFINITY" a plane surface, and "ASP" an aspherical surface.

TABLE 1

| si | ri | ASPHERICAL | di | ni | vi |
|----|----|------------|-----|------|-------|
| 1  | 9.171 |  | 0.522 | 1.9229 | 20.880 |
| 2  | 5.571 |  | 1.948 |  |  |
| 3  | INFINITY |  | 8.000 | 1.9037 | 31.310 |
| 4  | INFINITY |  | 0.200 |  |  |
| 5  | 49.940 | ASP | 1.712 | 1.6935 | 53.201 |
| 6  | −11.126 | ASP | variable |  |  |
| 7  | −12.687 |  | 0.401 | 1.7725 | 49.624 |
| 8  | 4.803 |  | 0.200 |  |  |
| 9  | 5.188 |  | 0.862 | 1.9229 | 20.880 |
| 10 | 11.312 |  | variable |  |  |
| 11 | INFINITY | IRIS APERTURE | 1.200 |  |  |
| 12 | 11.118 | ASP | 1.173 | 1.7725 | 49.624 |
| 13 | −8.613 | ASP | 2.338 |  |  |
| 14 | −5.217 |  | 0.400 | 1.7174 | 29.501 |
| 15 | 8.570 |  | 1.857 | 1.4875 | 70.441 |
| 16 | −4.137 |  | variable |  |  |
| 17 | −6.514 |  | 0.400 | 1.8350 | 42.984 |
| 18 | −109.938 |  | variable |  |  |
| 19 | 18.119 | ASP | 2.631 | 1.4875 | 70.441 |
| 20 | −6.664 | ASP | 9.032 |  |  |
| 21 | INFINITY |  | 1.100 | 1.5168 | 64.198 |
| 22 | INFINITY |  | 0.800 |  |  |

In the zoom lens 1 according to the first embodiment, the axial distance (air gap) d6 between the first lens group GR1 and the second lens group GR2, the axial distance (air gap) d10 between the second lens group GR3 and the iris aperture IR, the axial distance (air gap) d16 between the third lens group GR3 and the fourth lens group GR4, and the axial distance (air gap) d18 between the fourth lens group GR4 and the fifth lens group GR5 change during zooming. Table 2 shows axial distances (air gaps) at the wide-angle end state, an intermediate focal point position between the wide-angle end state and the telescopic end state, and the telescopic end state, f-numbers (FNO), and half angles ω of view. In Table 2, f represents the focal length of the entire lens system.

TABLE 2

| | f | | |
|---|---|---|---|
| | 6.000 | 9.000 | 16.800 |
| FNo | 3.995 | 4.339 | 5.046 |
| ω | 30.982 | 20.235 | 11.078 |
| d6 | 0.500 | 3.914 | 8.213 |
| d10 | 8.213 | 4.799 | 0.500 |
| d16 | 0.700 | 1.996 | 4.649 |
| d18 | 5.045 | 3.749 | 1.096 |

In the zoom lens 1 according to the first embodiment, the opposite surfaces s5, s6 of the second lens G3 of the first lens group GR1, the opposite surfaces s12, s13 of the positive lens G6 of the third lens group GR3, and the opposite surfaces s19, s20 of the positive lens S10 of the fifth lens group GR5 are aspherical. An aspherical shape is indicated by the following equation 1:

Equation 1:

$$x = \frac{y^2 \cdot c^2}{1 + (1 - (1+K) \cdot y^2 \cdot c^2)^{1/2}} + \sum A^i \cdot Y^i$$

where x: the distance along the optical axis from the crest of a lens surface;

y: the height perpendicular to the optical axis;

c: the paraxial curvature at the lens crest;

K: conic constant; and

Ai: aspherical coefficient of ith order.

Table 3 shows aspherical coefficients A, B, C, D of 4th, 6th, 8th, and 10th orders of the surfaces and conic constants in the numerical example 1.

TABLE 3

| si | K | A | B | C | D |
|----|---|---|---|---|---|
| 5  | 0.E+00 | 2.91E−05 | −7.93E−07 | −5.78E−08 | 1.13E−09 |
| 6  | 0.E+00 | −4.26E−05 | −2.11E−06 | −7.83E−08 | 1.15E−09 |
| 12 | 0.E+00 | −2.15E−04 | 6.96E−05 | −1.76E−05 | 3.20E−06 |
| 13 | 0.E+00 | 3.67E−04 | 8.94E−05 | −2.15E−05 | 3.78E−06 |
| 19 | 0.E+00 | −4.56E−04 | 1.20E−05 | −4.55E−07 | 6.49E−10 |
| 20 | 0.E+00 | 3.75E−04 | 2.84E−06 | 2.73E−07 | −1.22E−08 |

Figure 2:
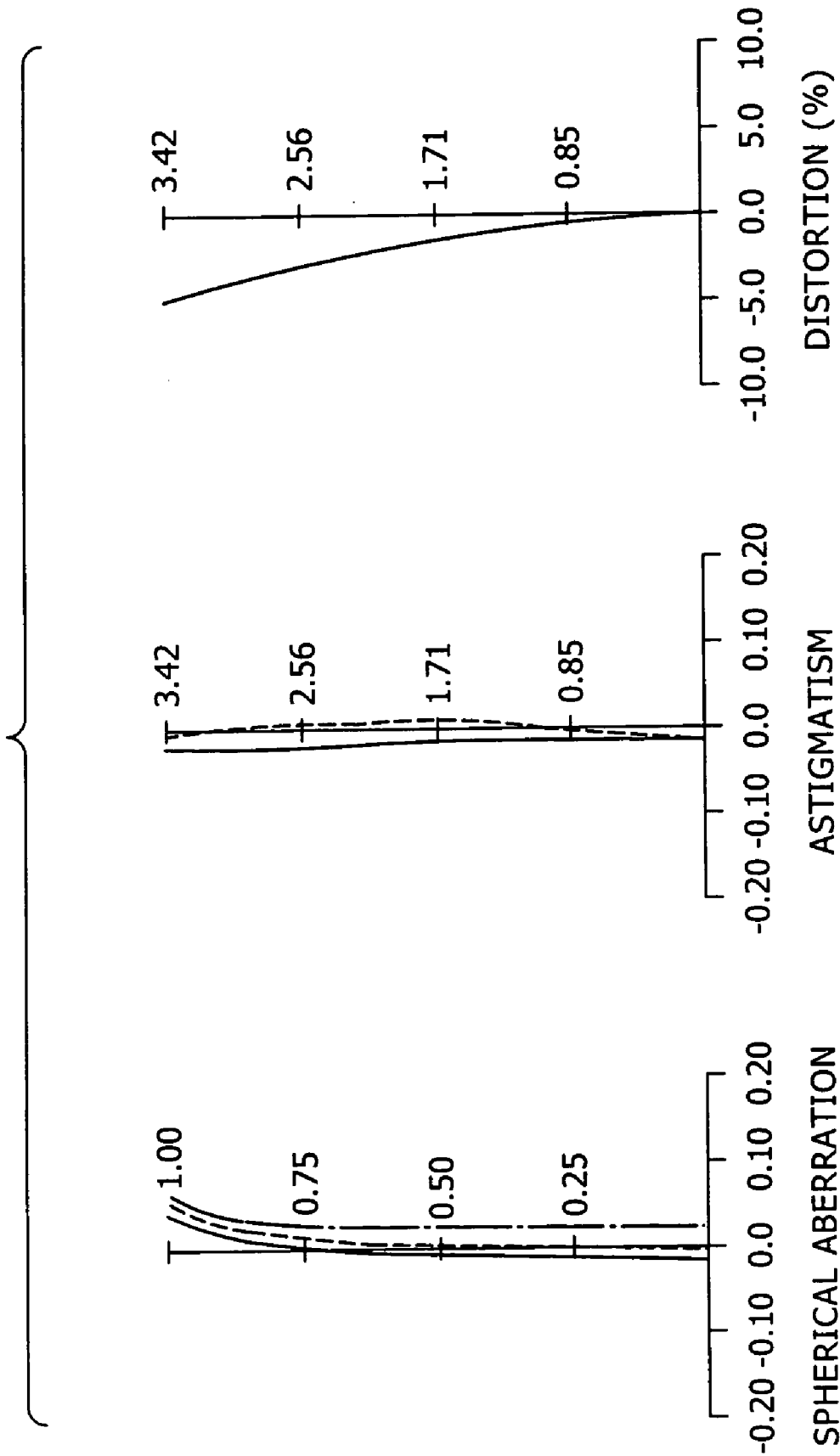
FIG. 2 is a diagram showing spherical aberration, astigmatism, and distortion values at a wide-angle end state.
Figure 3:
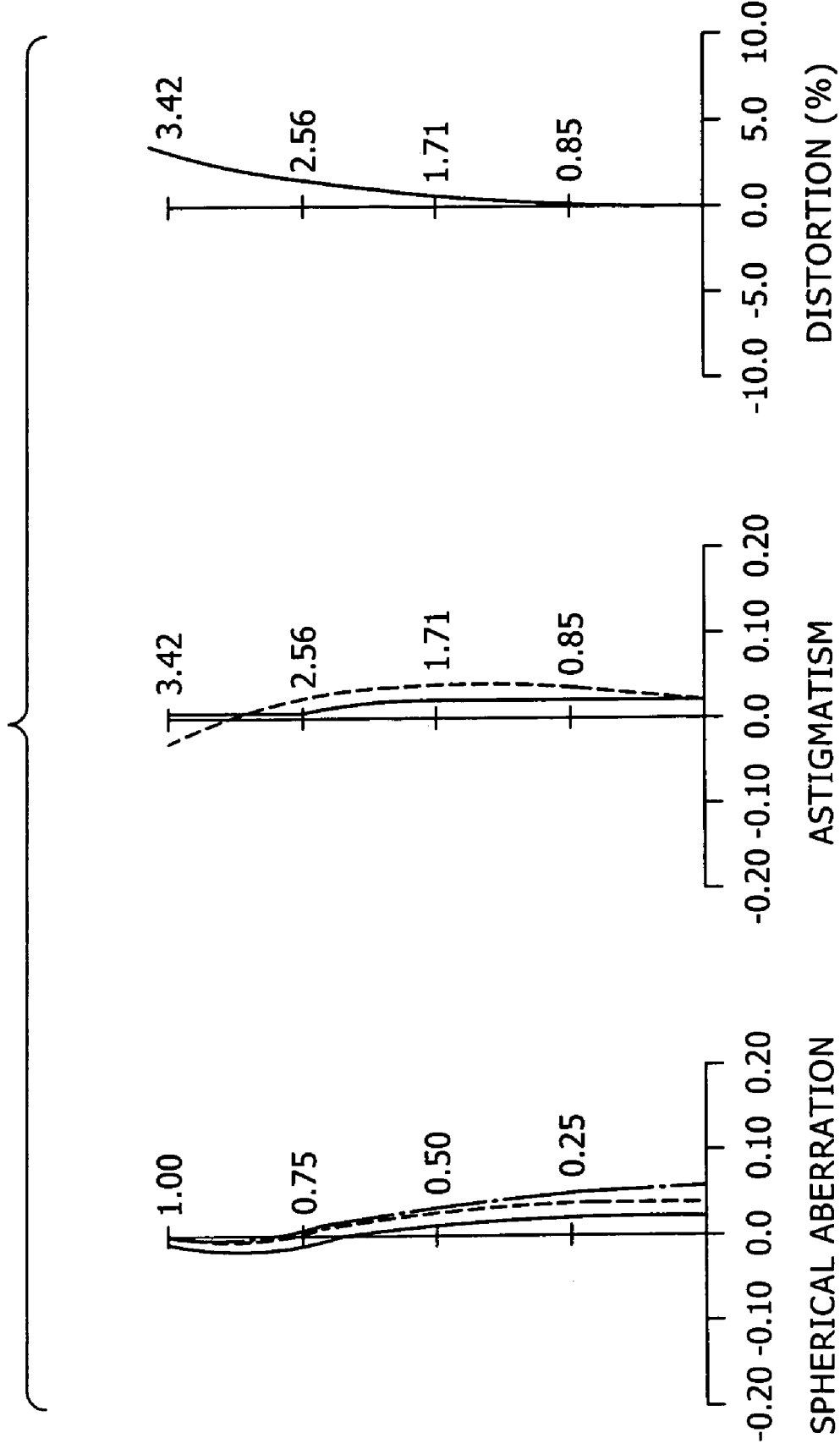
FIG. 3 is a diagram showing spherical aberration, astigmatism, and distortion values at an intermediate focal point position between a wide-angle end state and a telescopic end state.
Figure 4:
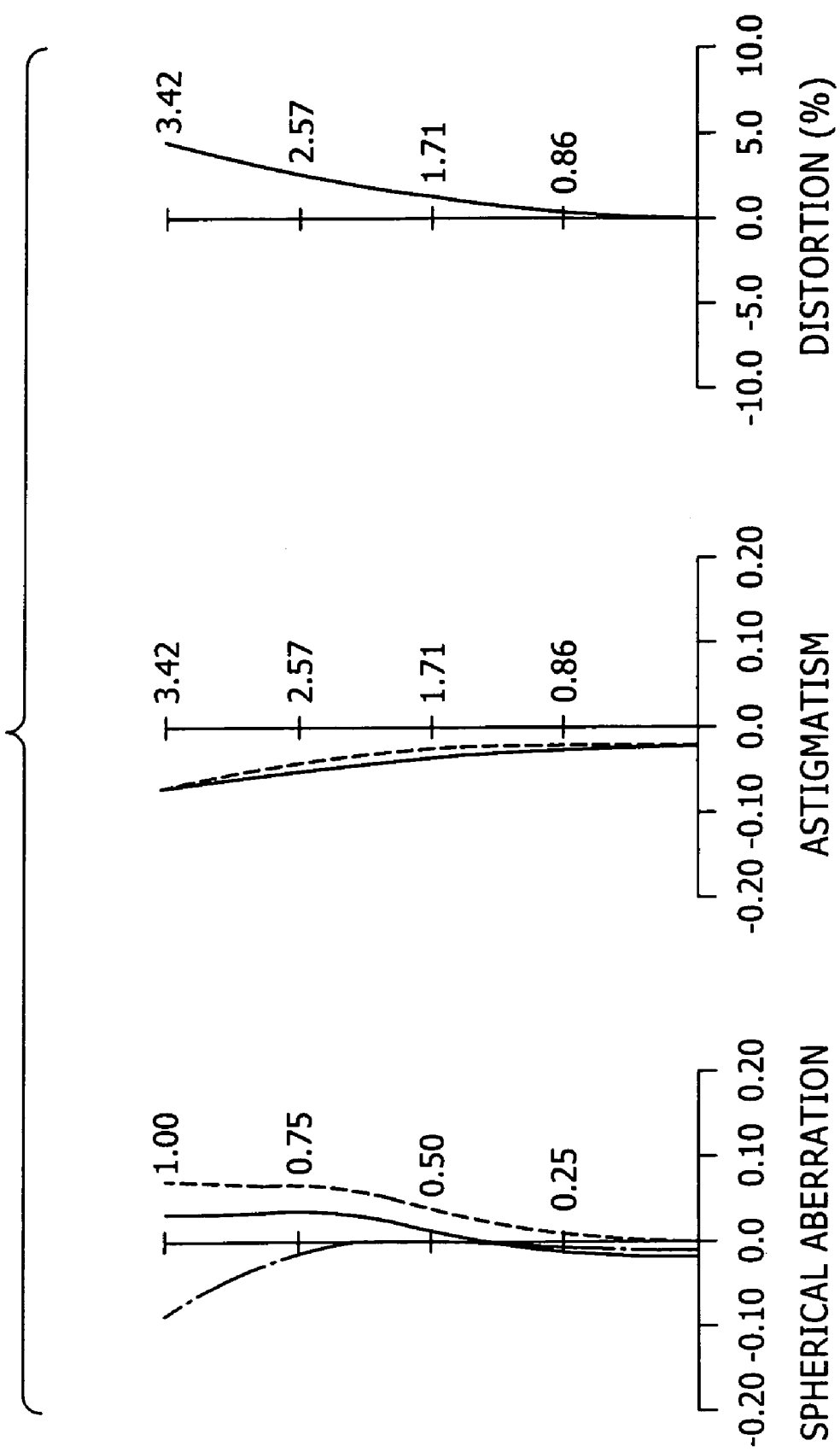
FIG. 4 is a diagram showing spherical aberration, astigmatism, and distortion values at a telescopic end state.

FIG. 2 shows spherical aberration, astigmatism, and distortion values at the wide-angle end state, FIG. 3 shows aberration, astigmatism, and distortion values at the intermediate focal point position between the wide-angle end state and the telescopic end state, and FIG. 4 shows aberration, astigmatism, and distortion values at the telescopic end state, all in the numerical example 1. With respect to the spherical aberration values, the vertical axis represents the ratio to the F-number at an open aperture, the horizontal axis defocus, the solid-line curve spherical aberration values at the d-line, the broken-line curve spherical aberration values at the C-line, and the dot-and-dash-line curve spherical aberration values at the g-line. With respect to the astigmatism values, the vertical axis represents the image height, the horizontal axis focus, the solid-line curve a sagittal image plane, and the broken-line curve a meridional image plane. With respect to the distortion values, the vertical axis represents the image height, and the horizontal axis %.

Figure 5:
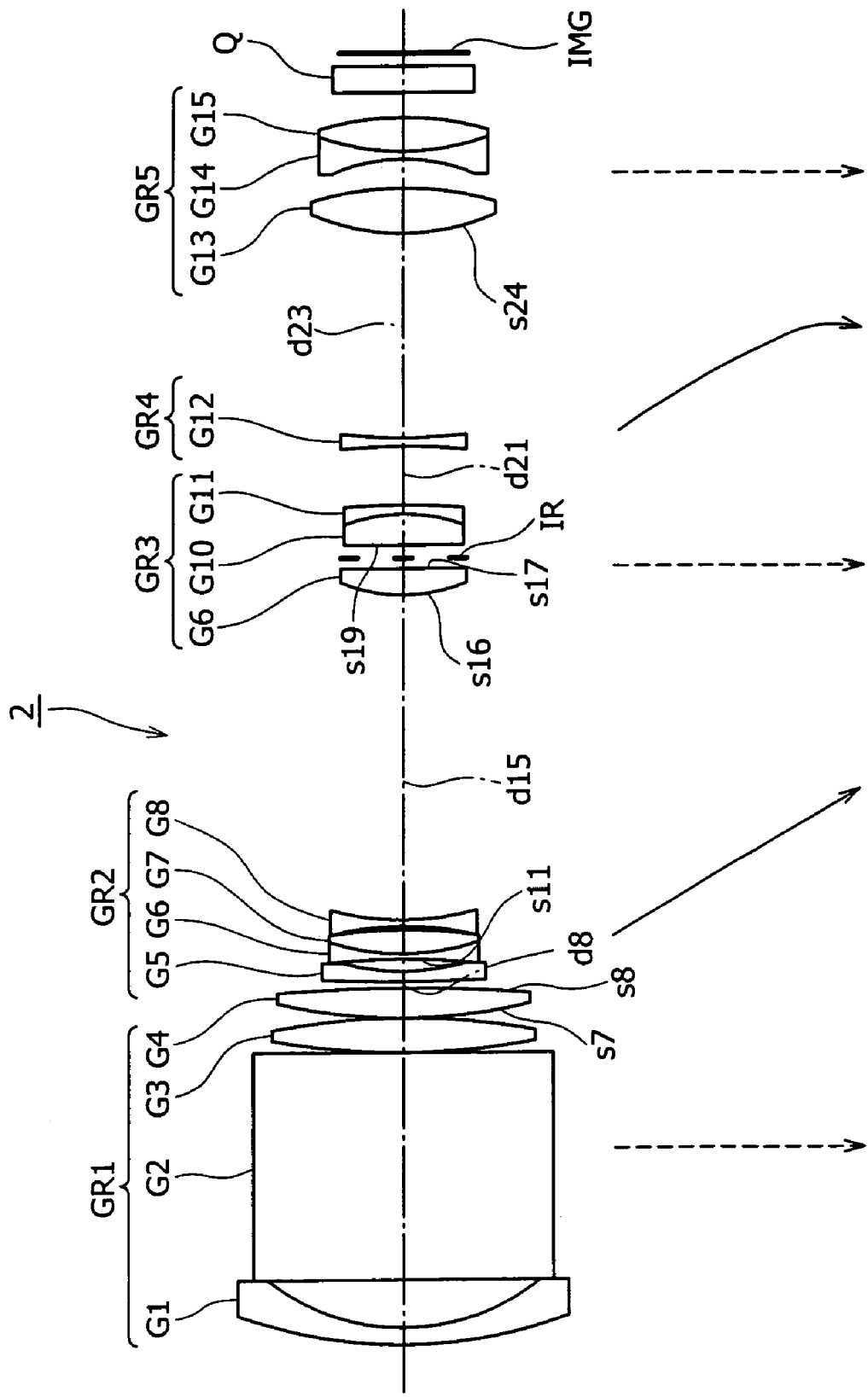
FIG. 5, together with FIGS. 6 through 8, shows a zoom lens according to a second embodiment of the present invention, FIG. 5 being a schematic view showing a lens arrangement.

FIG. 5 shows a lens arrangement of a zoom lens according to a second embodiment of the present invention. The zoom lens 2 according to the second embodiment includes a first lens group GR1 having a positive refractive power, a second lens group GR2 having a negative refractive power, a third lens group GR3 having a positive refractive power, a fourth lens group GR4 having a negative refractive power, and a fifth lens group GR5 having a positive refractive power, which are successively arranged in the order from the object side. The first lens group GR1 includes a first lens G1 which is a negative lens, a right-angle prism G2 for bending an optical path through 90°, a second lens G3 which is a positive lens, and a third lens G4, which is a positive lens, having opposite aspherical surfaces. The second lens group GR2 includes a negative lens G5, a combined lens assembly including a negative lens G6 having an aspherical surface facing the object side and a positive lens G7, and a negative lens G8. The third lens group G3 includes a positive lens G9 having opposite aspherical surfaces, and a combined lens assembly including a positive lens G10 having an aspherical surface facing the object side and a negative lens G11. The fourth lens group GR4 includes a negative lens G12. The fifth lens group GR5 includes a positive lens G13 having an aspherical surface facing the object side, and a combined lens assembly including a negative lens G14 and a positive lens G15. An iris aperture IR which is fixed during zooming is disposed in a position between the positive lens G9 having the opposite aspherical surfaces and the combined lens assembly (G10-G11) of the third lens group GR3, and a plane glass plate Q corresponding to a filter is interposed between a planned image plane IMG and the fifth lens group GR5.

The second lens group GR2 and the fourth lens group GR4 are movable for zooming. FIG. 5 shows the positions of the lenses at a wide-angle end state. As the focal length is shifted toward a telescopic end state, the lenses move as indicated by the arrows.

Table 4 values of the numerical example 2 where specific numerical values are applied to the zoom lens 2 according to the second embodiment.

TABLE 4

| si | ri | ASPHERICAL | di | ni | vi |
|---|---|---|---|---|---|
| 1 | 35.572 | | 1.042 | 1.9229 | 20.880 |
| 2 | 15.494 | | 2.755 | | |
| 3 | INFINITY | | 15.000 | 1.8830 | 40.805 |
| 4 | INFINITY | | 0.200 | | |
| 5 | 52.473 | | 1.941 | 1.4970 | 81.608 |
| 6 | −37.567 | | 0.200 | | |
| 7 | 43.201 | ASP | 1.877 | 1.7742 | 43.686 |
| 8 | −78.852 | ASP | variable | | |
| 9 | −146.213 | | 0.450 | 1.8830 | 40.805 |
| 10 | 23.160 | | 0.813 | | |
| 11 | −22.887 | ASP | 0.450 | 1.7725 | 49.624 |
| 12 | 18.460 | | 1.267 | 1.9229 | 20.880 |
| 13 | −59.134 | | 0.380 | | |
| 14 | −16.936 | | 0.450 | 1.4877 | 70.372 |
| 15 | 21.182 | | variable | | |
| 16 | 12.067 | ASP | 1.600 | 1.6935 | 53.201 |
| 17 | −87.934 | ASP | 0.600 | | |
| 18 | INFINITY | IRIS APERTURE | 1.000 | | |
| 19 | 39.073 | ASP | 2.000 | 1.5849 | 59.195 |
| 20 | −11.150 | | 0.450 | 1.8041 | 24.874 |
| 21 | −53.983 | | variable | | |
| 22 | −43.465 | | 0.450 | 1.6742 | 53.546 |
| 23 | 27.847 | | variable | | |
| 24 | 12.268 | ASP | 2.800 | 1.7725 | 49.624 |
| 25 | −19.769 | | 2.081 | | |
| 26 | −11.588 | | 0.450 | 1.9229 | 20.8804 |
| 27 | 15.755 | | 1.944 | 1.7725 | 49.6243 |
| 28 | −19.962 | | 1.692 | | |

TABLE 4-continued

| si | ri | ASPHERICAL | di | ni | vi |
|---|---|---|---|---|---|
| 29 | INFINITY | | 1.330 | 1.5168 | 64.1983 |
| 30 | INFINITY | | 0.800 | | |

In the zoom lens 2 according to the second embodiment, the axial distance (air gap) d8 between the first lens group GR1 and the second lens group GR2, the axial distance (air gap) d15 between the second lens group GR2 and the third lens group GR3, the axial distance (air gap) d21 between the third lens group GR3 and the fourth lens group GR4, and the axial distance (air gap) d23 between the fourth lens group GR4 and the fifth lens group GR5 change during zooming. Table 5 shows axial distances (air gaps) at the wide-angle end state, an intermediate focal point position between the wide-angle end state and the telescopic end state, and the telescopic end state, F-numbers FNO, and half angles ω of view. In Table 5, f represents the focal length of the entire lens system.

TABLE 5

| | f | | |
|---|---|---|---|
| | 6.000 | 15.000 | 42.000 |
| FNo | 3.606 | 4.046 | 4.128 |
| ω | 33.691 | 13.505 | 4.967 |
| d8 | 0.500 | 11.420 | 21.125 |
| d15 | 21.221 | 10.301 | 0.596 |
| d21 | 4.059 | 11.906 | 16.257 |
| d23 | 13.198 | 5.351 | 1.000 |

In the zoom lens 2 according to the second embodiment, the opposite surfaces s7, s8 of the third lens G4 of the first lens group GR1, the object-side surface s11 of the combined lens assembly (G6-G7) of the second lens group GR2, the opposite surfaces s16, 17 of the positive lens G9 of the third lens group GR3, the object-side surface s19 of the combined lens assembly (G10-G11) of the third lens GR3, and the object-side surface s24 of the positive lens G13 of the fifth lens group GR5 are aspherical.

Table 6 shows aspherical coefficients A, B, C, D of 4th, 6th, 8th, and 10th orders of the surfaces and conic constants in the numerical example 2.

TABLE 6

| si | K | A | B | C | D |
|---|---|---|---|---|---|
| 7 | 0.E+00 | −7.13E−06 | −7.65E−08 | −1.17E−09 | 4.66E−11 |
| 8 | 0.E+00 | −1.37E−05 | −1.56E−07 | 7.06E−10 | 3.35E−11 |
| 11 | 0.E+00 | 6.07E−05 | −2.32E−06 | 1.07E−07 | −2.11E−09 |
| 16 | 0.E+00 | 9.91E−05 | 1.07E−06 | −2.61E−07 | −1.07E−08 |
| 17 | 0.E+00 | −1.98E−05 | −3.52E−06 | −4.24E−07 | −2.24E−09 |
| 19 | 0.E+00 | 2.99E−04 | −1.14E−05 | 8.92E−08 | −2.50E−09 |
| 24 | 0.E+00 | 1.23E−04 | 1.84E−06 | −8.22E−08 | 1.08E−09 |

Figure 6:
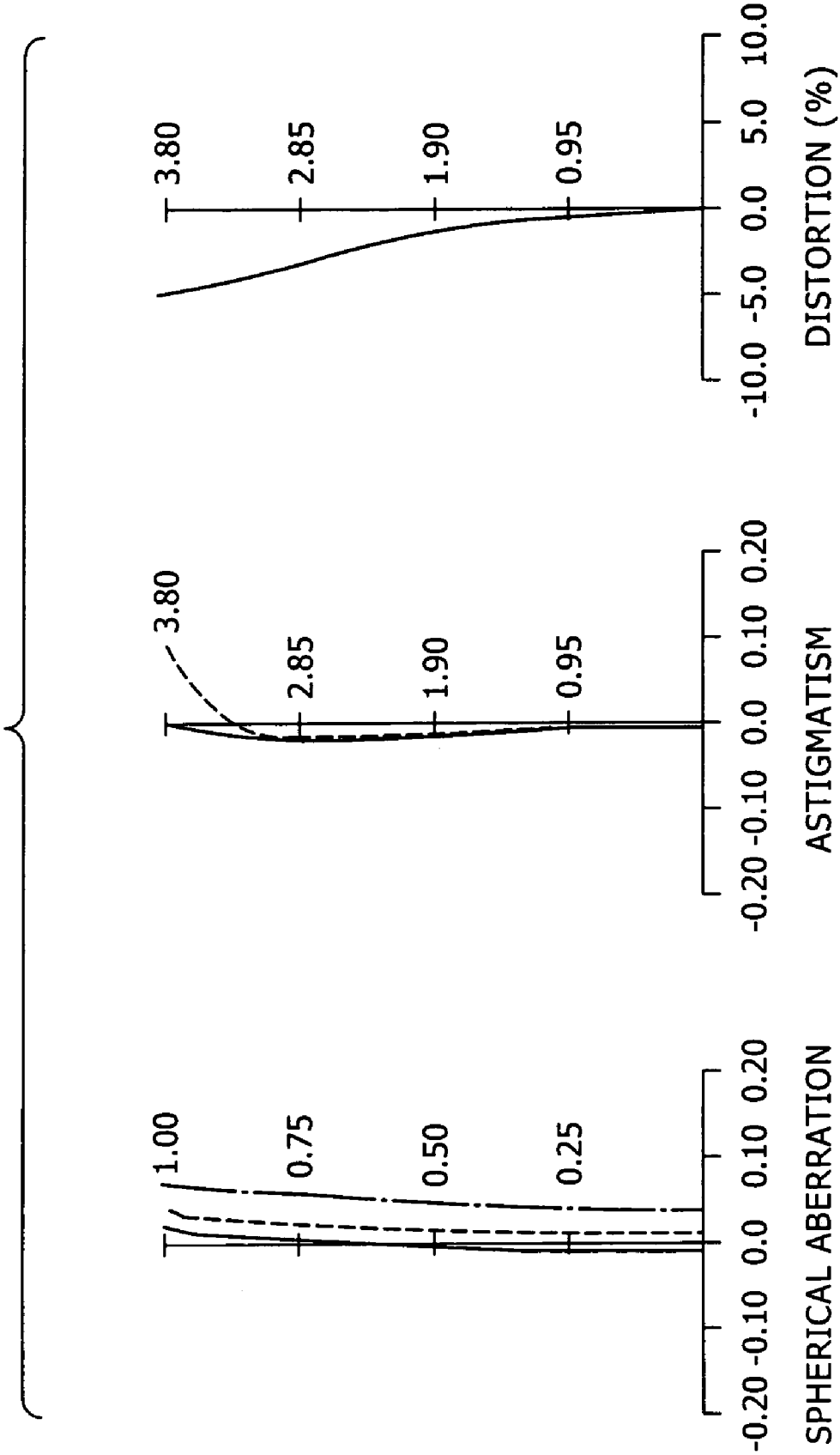
FIG. 6 is a diagram showing spherical aberration, astigmatism, and distortion values at a wide-angle end state.
Figure 7:
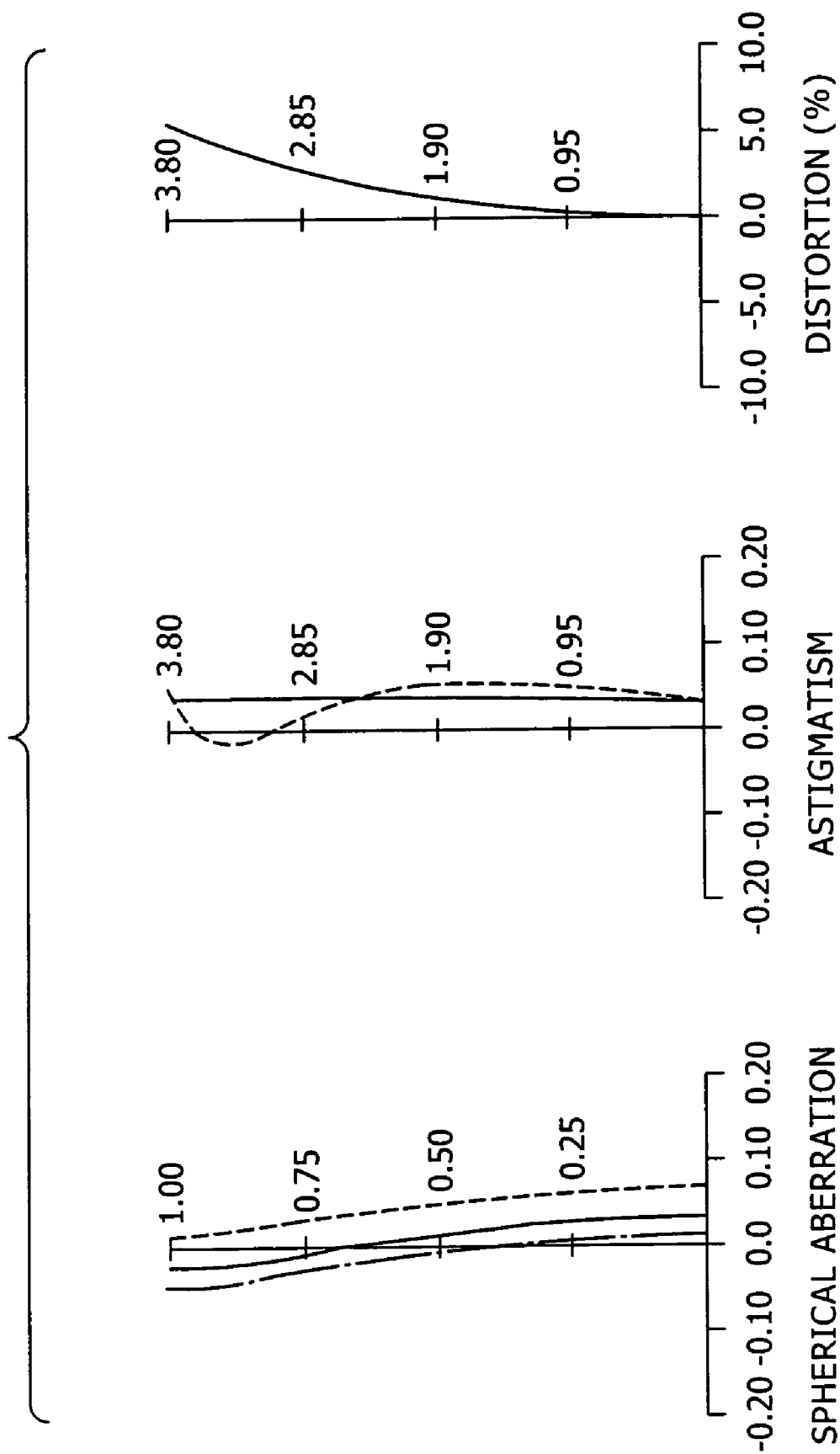
FIG. 7 is a diagram showing spherical aberration, astigmatism, and distortion values at an intermediate focal point position between a wide-angle end state and a telescopic end state.
Figure 8:
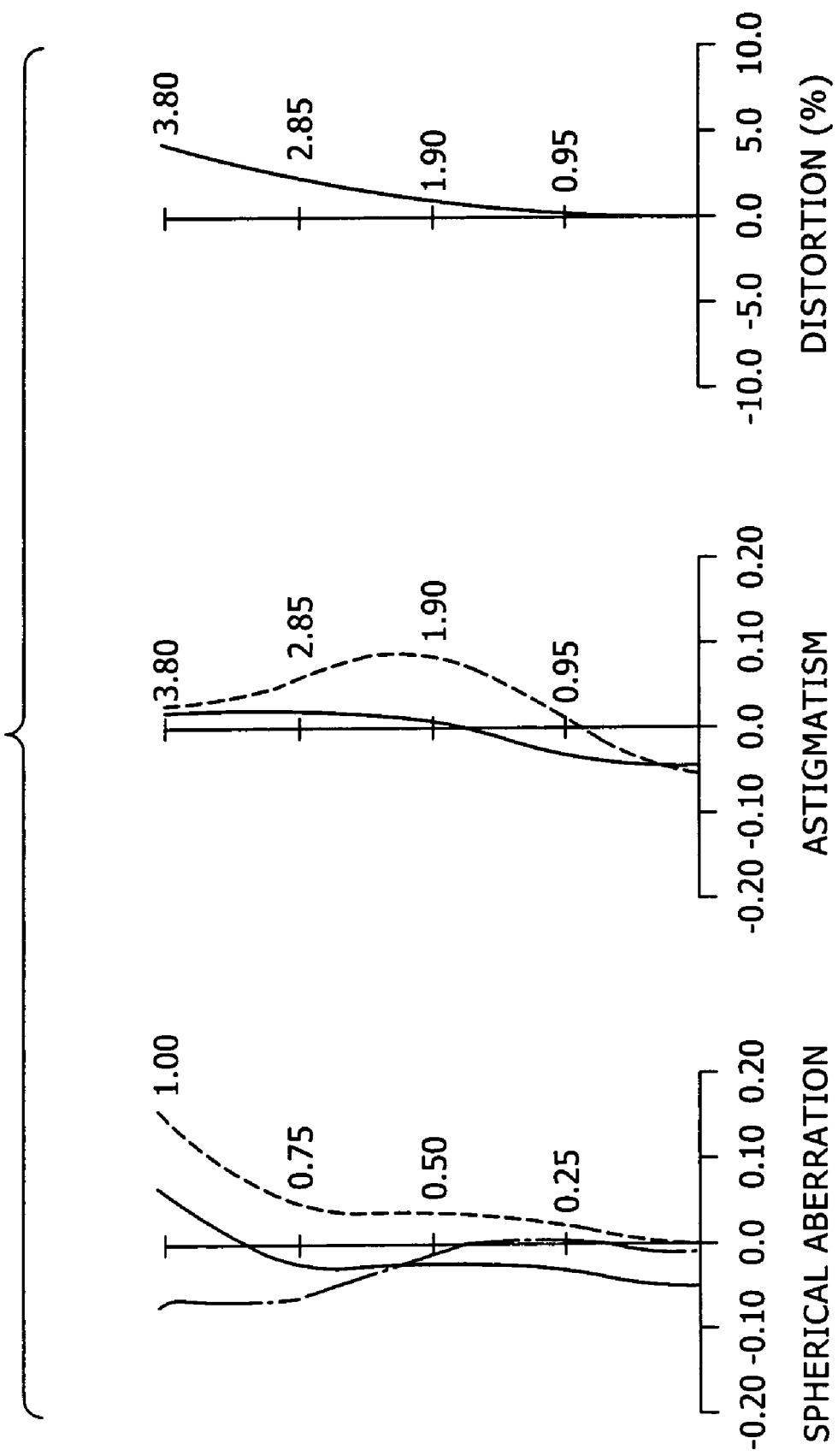
FIG. 8 is a diagram showing spherical aberration, astigmatism, and distortion values at a telescopic end state.

FIG. 6 shows spherical aberration, astigmatism, and distortion values at the wide-angle end state, FIG. 7 shows spherical aberration, astigmatism, and distortion values at the intermediate focal point position between the wide-angle end state and the telescopic end state, and FIG. 8 shows spherical aberration, astigmatism, and distortion values at the telescopic end state, all in the numerical example 2. With respect to the spherical aberration values, the vertical axis represents the ratio to the f-number at an open aperture, the horizontal axis defocus, the solid-line curve spherical aberration values at the d-line, the broken-line curve spherical aberration values at the C-line, and the dot-and-dash-line curve spherical aberration values at the g-line. With respect to the astigmatism values, the vertical axis represents the image height, the horizontal axis focus, the solid-line curve a sagittal image plane, and the broken-line curve a meridional image plane. With respect to the distortion values, the vertical axis represents the image height, and the horizontal axis %.

Figure 9:
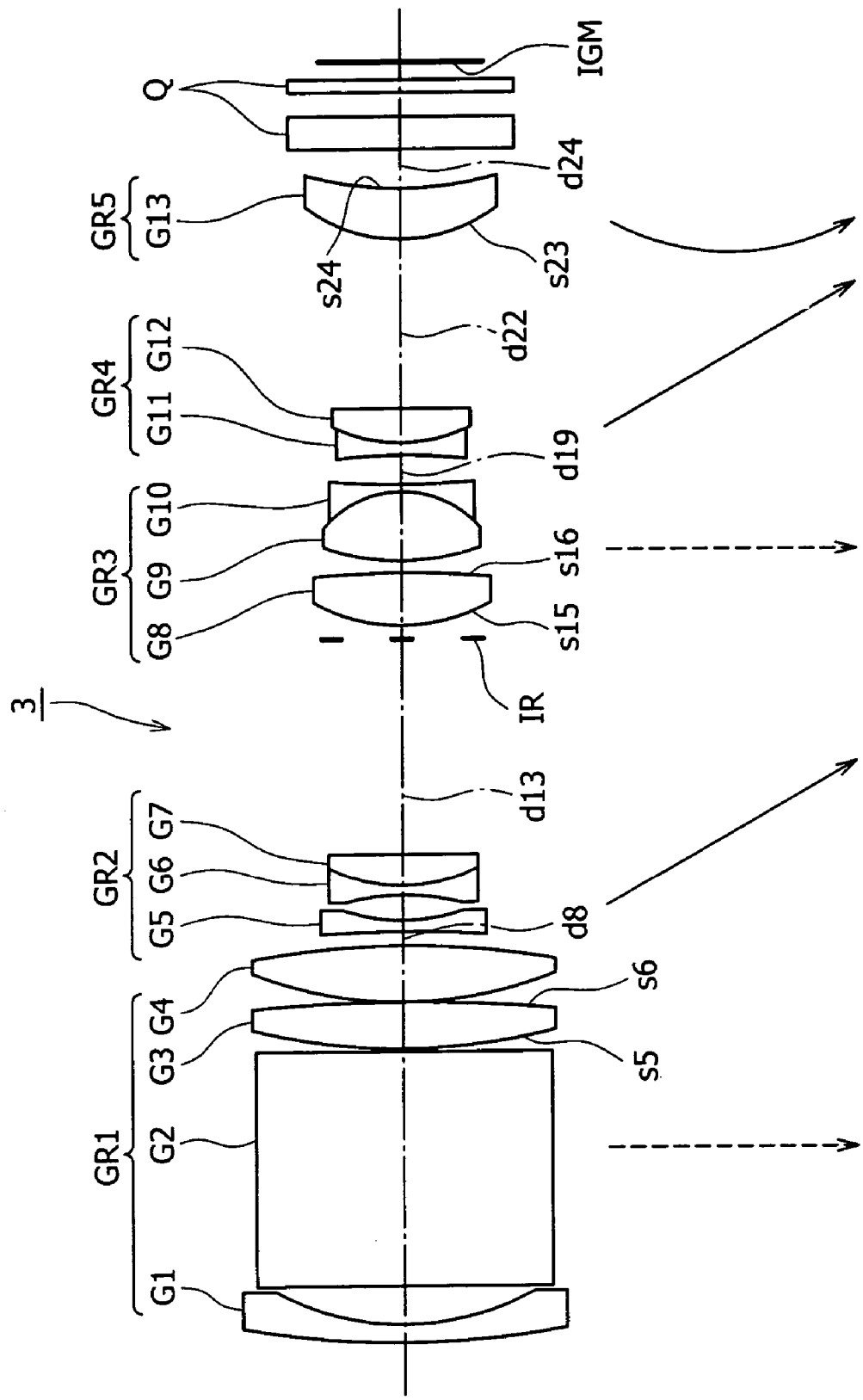
FIG. 9, together with FIGS. 10 through 12, shows a zoom lens according to a third embodiment of the present invention, FIG. 9 being a schematic view showing a lens arrangement.

FIG. 9 shows a lens arrangement of a zoom lens according to a third embodiment of the present invention. The zoom lens 3 according to the third embodiment includes a first lens group GR1 having a positive refractive power, a second lens group GR2 having a negative refractive power, a third lens group GR3 having a positive refractive power, a fourth lens group GR4 having a negative refractive power, and a fifth lens group GR5 having a positive refractive power, which are successively arranged in the order from the object side. The first lens group GR1 includes a first lens G1 which is a negative lens, a right-angle prism G2 for bending an optical path through 90°, a second lens G3, which is a positive lens, having opposite aspherical surfaces, and a third lens G4 which is a positive lens. The second lens group GR2 includes a negative lens G5 and a combined lens assembly including a negative lens G6 and a positive lens G7. The third lens group G3 includes a positive lens G8 having opposite aspherical surfaces, and a combined lens assembly including a positive lens G9 and a negative lens G10. The fourth lens group GR4 includes a combined lens assembly including a negative lens G11 and a positive lens G12. The fifth lens group GR5 includes a positive lens G13 having opposite aspherical surfaces. An iris aperture IR which is fixed during zooming is disposed immediately before the third lens group GR3, and a plane glass plate Q corresponding to a filter is interposed between a planned image plane IMG and the fifth lens group GR5.

The second lens group GR2, the fourth lens group GR4, and the fifth lens group GR5 are movable for zooming. FIG. 9 shows the positions of the lenses at a wide-angle end state. As the focal length is shifted toward a telescopic end state, the lenses move as indicated by the arrows.

Table 7 values of the numerical example 3 where specific numerical values are applied to the zoom lens 3 according to the third embodiment.

TABLE 7

| 1 | 43.628 | | 0.800 | 1.9229 | 20.884 |
|---|---|---|---|---|---|
| 2 | 14.163 | | 2.060 | | |
| 3 | INFINITY | | 11.740 | 1.8467 | 23.785 |
| 4 | INFINITY | | 0.345 | | |
| 5 | 25.297 | ASP | 2.251 | 1.7433 | 49.326 |
| 6 | −140.649 | ASP | 0.100 | | |
| 7 | 19.783 | | 3.000 | 1.4970 | 81.608 |
| 8 | −31.752 | | variable | | |
| 9 | −43.377 | | 0.500 | 1.8830 | 40.805 |
| 10 | 7.611 | | 1.248 | | |
| 11 | −17.123 | | 0.540 | 1.7725 | 49.624 |
| 12 | 7.642 | | 1.428 | 1.9229 | 20.884 |
| 13 | 146.839 | | variable | | |
| 14 | INFINITY | ISIS APERTURE | 0.600 | | |
| 15 | 9.316 | ASP | 2.611 | 1.7308 | 40.500 |
| 16 | −52.424 | ASP | 0.750 | | |
| 17 | 9.726 | | 3.650 | 1.6477 | 33.841 |
| 18 | −5.076 | | 0.550 | 1.9229 | 20.884 |
| 19 | 116.814 | | variable | | |
| 20 | −22.586 | | 0.640 | 1.8061 | 33.269 |
| 21 | 8.465 | | 1.638 | 1.4970 | 81.608 |
| 22 | −7194.674 | | variable | | |
| 23 | 7.937 | ASP | 2.600 | 1.5831 | 59.461 |
| 24 | 27.627 | ASP | variable | | |
| 25 | INFINITY | | 1.700 | 1.5168 | 64.198 |
| 26 | INFINITY | | 1.120 | | |

TABLE 7-continued

| 27 | INFINITY | 0.500 | 1.5168 | 64.198 |
|---|---|---|---|---|
| 28 | INFINITY | 0.990 | | |

In the zoom lens 3 according to the third embodiment, the axial distance (air gap) d8 between the first lens group GR1 and the second lens group GR2, the axial distance (air gap) d13 between the second lens group GR2 and the iris aperture IR, the axial distance (air gap) d19 between the third lens group GR3 and the fourth lens group GR4, the axial distance (air gap) d22 between the fourth lens group GR4 and the fifth lens group GR5, and the axial distance (air gap) d24 between the fifth lens group GR5 and a protective filter LPF change during zooming. Table 8 shows axial distances (air gaps) at the wide-angle end state, an intermediate focal point position between the wide-angle end state and the telescopic end state, and the telescopic end state, F-numbers FNO, and half angles ω of view. In Table 8, f represents the focal length of the entire lens system.

TABLE 8

| | f | | |
|---|---|---|---|
| | 6.899 | 12.760 | 33.696 |
| FNo | 3.600 | 3.717 | 3.939 |
| ω | 29.708 | 16.537 | 6.252 |
| d8 | 0.658 | 5.508 | 11.14048 |
| d13 | 11.282 | 6.433 | 0.800 |
| d19 | 1.390 | 3.220 | 6.948 |
| d22 | 8.669 | 3.859 | 2.000 |
| d24 | 2.000 | 4.980 | 3.111 |

In the zoom lens 3 according to the third embodiment, the opposite surfaces s5, s6 of the second lens G3 of the first lens group GR1, the opposite surfaces s15, s16 of the positive lens G8 of the third lens group GR3, and the opposite surfaces s23, s24 of the positive lens G13 of the fifth lens group GR5 are aspherical.

Table 9 shows aspherical coefficients A, B, C, D of 4th, 6th, 8th, and 10th orders of the surfaces and conic constants in the numerical example 3.

TABLE 9

| si | K | A | B | C | D |
|---|---|---|---|---|---|
| 5 | 0.E+00 | −4.56E−05 | −2.26E−07 | 1.56E−10 | −7.25E−11 |
| 6 | 0.E+00 | −2.85E−05 | −1.53E−07 | −2.40E−10 | −6.69E−11 |
| 15 | 0.E+00 | 2.49E−04 | 5.48E−06 | 6.95E−10 | 2.83E−09 |
| 16 | 0.E+00 | 2.47E−04 | 4.80E−06 | −1.18E−07 | 1.24E−09 |
| 23 | 0.E+00 | −1.30E−04 | −1.62E−06 | −5.11E−07 | 9.25E−09 |
| 24 | 0.E+00 | 3.74E−04 | 1.65E−05 | −1.96E−06 | 4.59E−08 |

Figure 10:
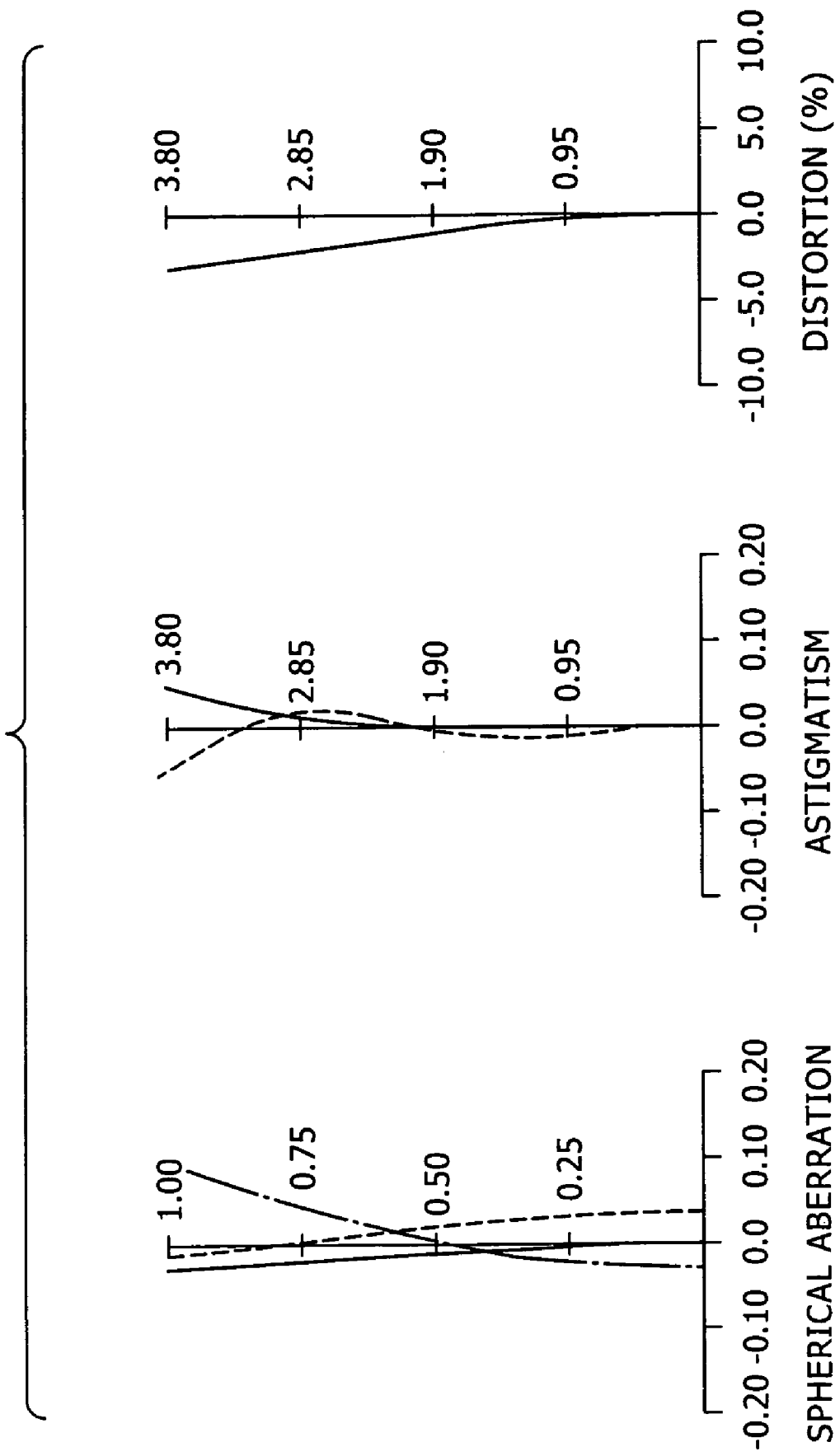
FIG. 10 is a diagram showing spherical aberration, astigmatism, and distortion values at a wide-angle end state.
Figure 11:
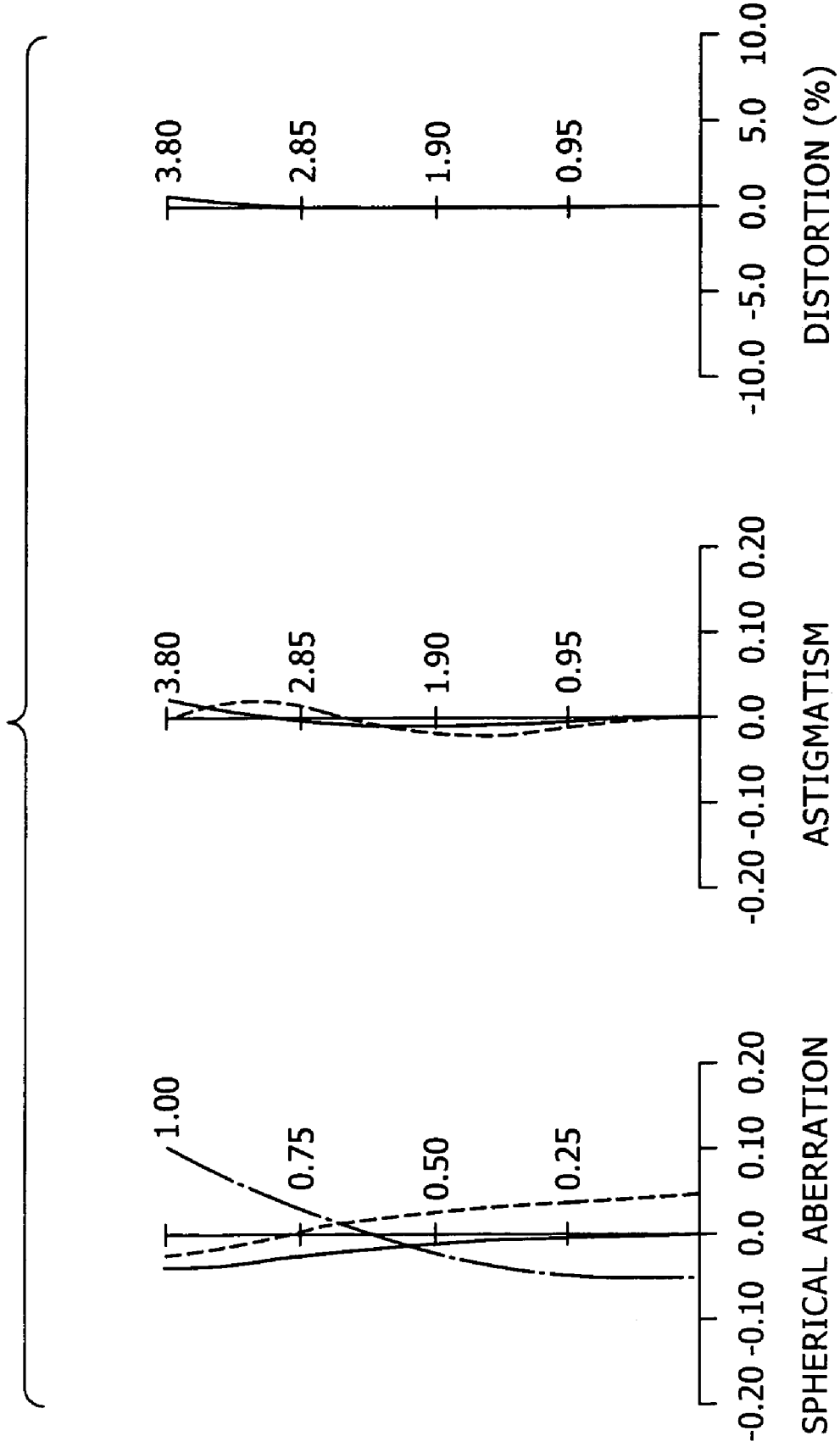
FIG. 11 is a diagram showing spherical aberration, astigmatism, and distortion values at an intermediate focal point position between a wide-angle end state and a telescopic end state.
Figure 12:
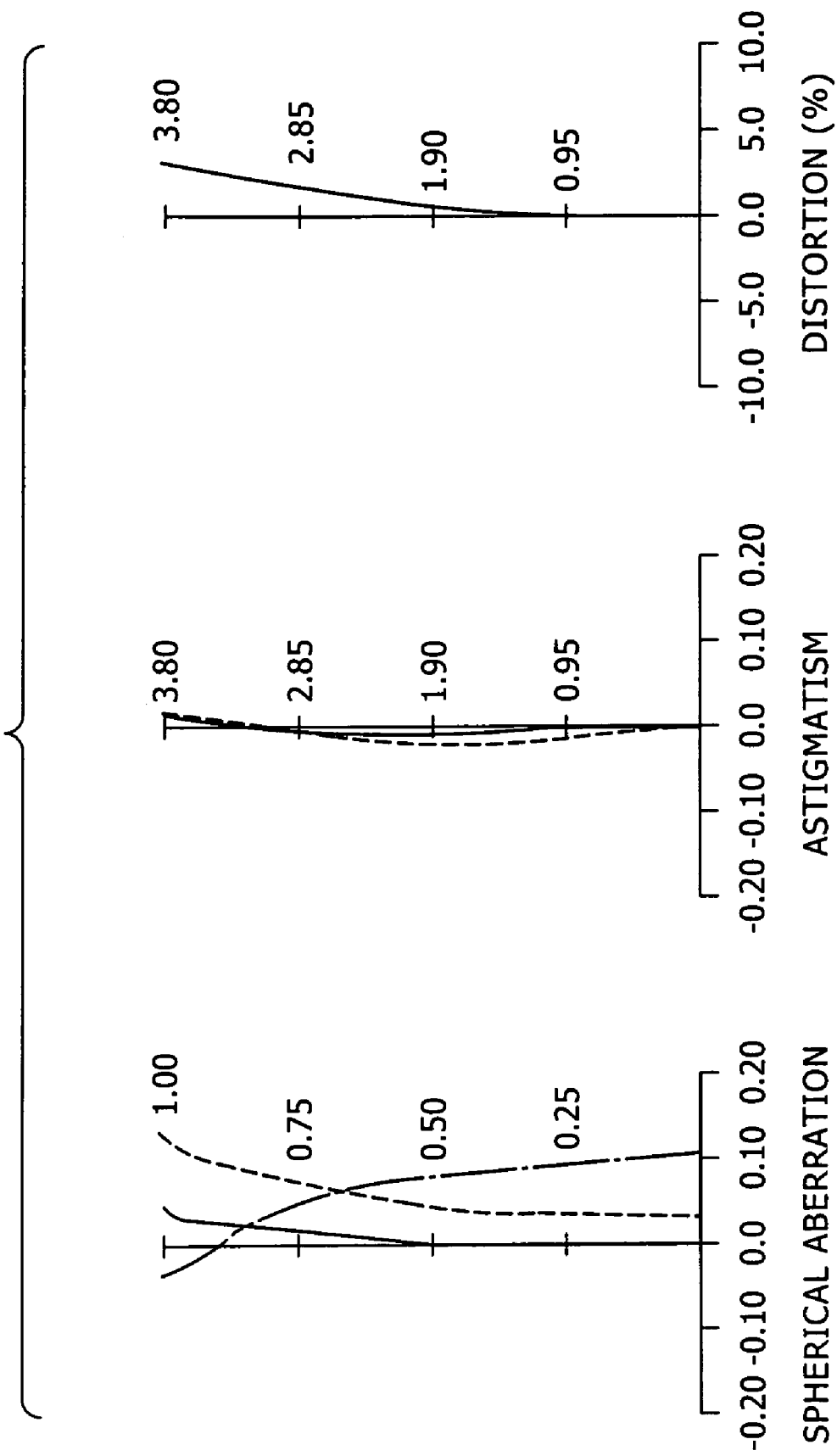
FIG. 12 is a diagram showing spherical aberration, astigmatism, and distortion values at a telescopic end state.

FIG. 10 shows spherical aberration, astigmatism, and distortion values at the wide-angle end state, FIG. 11 shows spherical aberration, astigmatism, and distortion values at the intermediate focal point position between the wide-angle end state and the telescopic end state, and FIG. 12 shows spherical aberration, astigmatism, and distortion values at the telescopic end state, all in the numerical example 3. With respect to the spherical aberration values, the vertical axis represents the ratio to the F-number at an open aperture, the horizontal axis defocus, the solid-line curve spherical aberration values at the d-line, the broken-line curve spherical aberration values at the C-line, and the dot-and-dash-line curve spherical aberration values at the g-line. With respect to the astigmatism values, the vertical axis represents the image height, the horizontal axis focus, the solid-line curve a sagittal image plane, and the broken-line curve a meridional image plane. With respect to the distortion values, the vertical axis represents the image height, and the horizontal axis %.

Figure 13:
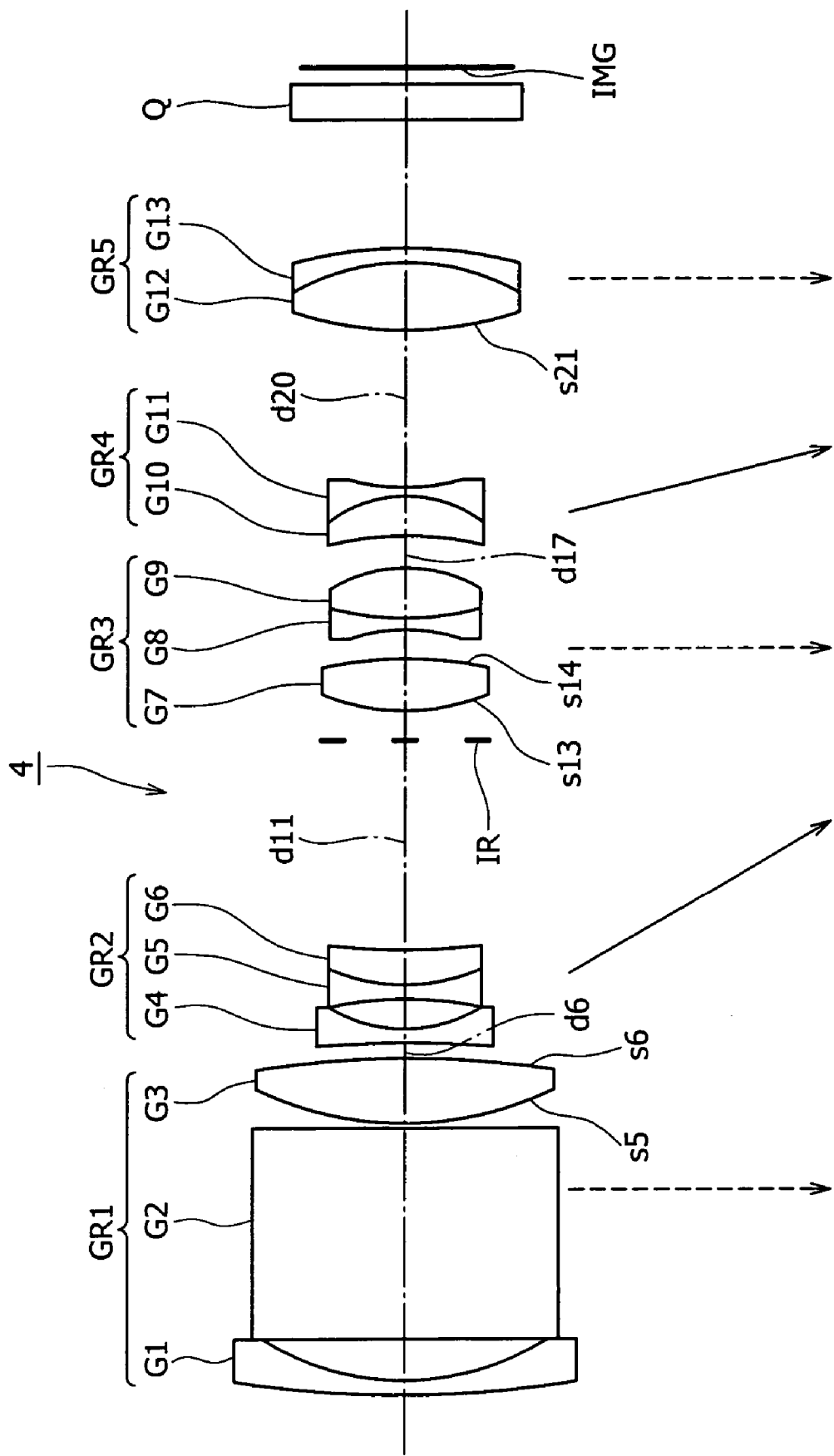
FIG. 13, together with FIGS. 14 through 16, shows a zoom lens according to a fourth embodiment of the present invention, FIG. 13 being a schematic view showing a lens arrangement.

FIG. 13 shows a lens arrangement of a zoom lens according to a fourth embodiment of the present invention. The zoom lens 4 according to the fourth embodiment includes a first lens group GR1 having a positive refractive power, a second lens group GR2 having a negative refractive power, a third lens group GR3 having a positive refractive power, a fourth lens group GR4 having a negative refractive power, and a fifth lens group GR5 having a positive refractive power, which are successively arranged in the order from the object side. The first lens group GR1 includes a first lens G1 which is a negative lens, a right-angle prism G2 for bending an optical path through 90°, and a second lens G3, which is a positive lens, having opposite aspherical surfaces. The second lens group GR2 includes a negative lens G4 and a combined lens assembly including a negative lens G5 and a positive lens G6. The third lens group G3 comprises a positive lens G7 having opposite aspherical surfaces, and a combined lens assembly including a negative lens G8 and a positive lens G9. The fourth lens group GR4 includes a combined lens assembly including a positive lens G10 and a negative lens G11. The fifth lens group GR5 includes a combined lens assembly including a positive lens G12 having opposite aspherical surfaces and a negative lens 13. An iris aperture IR which is fixed during zooming is disposed immediately in front of the third lens group GR3, and a plane glass plate Q corresponding to a filter is interposed between a planned image plane IMG and the fifth lens group GR5.

The second lens group GR2 and the fourth lens group GR4 are movable for zooming. FIG. 13 shows the positions of the lenses at a wide-angle end state. As the focal length is shifted toward a telescopic end state, the lenses move as indicated by the arrows.

Table 10 values of the numerical example 4 where specific numerical values are applied to the zoom lens 4 according to the fourth embodiment.

TABLE 10

| si | ri | ASPHERICAL | di | ni | vi |
|----|-----|------------|-------|---------|--------|
| 1  | 34.026 |         | 0.600 | 1.92286 | 20.884 |
| 2  | 11.268 |         | 1.500 |         |        |
| 3  | INFINITY |       | 8.000 | 1.90366 | 31.310 |
| 4  | INFINITY |       | 0.200 |         |        |
| 5  | 11.958 | ASP    | 2.426 | 1.77250 | 49.624 |
| 6  | -31.628 | ASP   | variable |      |        |
| 7  | -69.801 |       | 0.600 | 1.90366 | 31.310 |
| 8  | 5.043  |        | 1.170 |         |        |
| 9  | -10.874 |       | 0.500 | 1.48749 | 70.441 |
| 10 | 6.427  |        | 1.404 | 1.92286 | 20.884 |
| 11 | 56.650 |        | Variable |      |        |
| 12 | INFINITY | IRIS APERTURE | 1.200 |  |        |
| 13 | 8.322  | ASP    | 1.866 | 1.76802 | 49.240 |
| 14 | -11.056 | ASP   | 1.192 |         |        |
| 15 | -11.371 |       | 0.500 | 1.92286 | 20.884 |
| 16 | 11.032 |        | 1.889 | 1.48749 | 70.441 |
| 17 | -5.713 |        | Variable |      |        |
| 18 | -14.398 |       | 1.558 | 1.90366 | 31.310 |
| 19 | -4.454 |        | 0.500 | 1.80420 | 46.503 |
| 20 | 16.660 |        | Variable |      |        |
| 21 | 10.538 | ASP    | 2.460 | 1.48749 | 70.441 |
| 22 | -8.000 |        | 0.500 | 1.92286 | 20.884 |
| 23 | -16.390 |       | 4.940 |         |        |
| 24 | INFINITY |      | 1.100 | 1.51680 | 64.198 |
| 25 | INFINITY |      | 0.800 |         |        |

In the zoom lens 4 according to the fourth embodiment, the axial distance (air gap) d6 between the first lens group GR1 and the second lens group GR2, the axial distance (air gap) d11 between the second lens group GR3 and the iris apertures IR, the axial distance (air gap) d17 between the third lens group GR3 and the fourth lens group GR4, and the axial distance (air gap) d20 between the fourth lens group GR4 and the fifth lens group GR5 change during zooming. Table 11 shows axial distances (air gaps) at the wide-angle end state, an intermediate focal point position between the wide-angle end state and the telescopic end state, and the telescopic end state, F-numbers FNO, and half angles ω of view. In Table 11, f represents the focal length of the entire lens system.

TABLE 11

|     | f |  |  |
|-----|--------|--------|--------|
|     | 6.500  | 13.000 | 18.655 |
| FNo | 4.120  | 4.315  | 4.371  |
| ω   | 31.567 | 15.933 | 11.224 |
| d6  | 0.600  | 5.413  | 7.550  |
| d11 | 7.750  | 2.936  | 0.800  |
| d17 | 1.268  | 3.530  | 4.781  |
| d20 | 5.886  | 3.624  | 2.373  |

In the zoom lens 4 according to the fourth embodiment, the opposite surfaces s5, s6 of the second lens G3 of the first lens group GR1, the opposite surfaces s13, 14 of the positive lens G7 of the third lens group GR3, and the object-side surface s21 of the combined lens (G12-G13) of the fifth lens group GR5 are aspherical.

Table 12 shows aspherical coefficients A, B, C, D of 4th, 6th, 8th, and 10th orders of the surfaces and conic constants in the numerical example 4.

TABLE 12

| si | K | A | B | C | D |
|----|--------|-----------|-----------|-----------|-----------|
| 5  | 0.E+00 | -6.72E-05 | -1.80E-06 | 1.42E-08  | 1.91E-09  |
| 6  | 0.E+00 | 2.83E-06  | -1.96E-06 | 7.57E-08  | 8.36E-10  |
| 13 | 0.E+00 | -1.87E-04 | 7.34E-05  | -6.55E-05 | 7.30E-07  |
| 14 | 0.E+00 | 7.71E-04  | 8.91E-05  | -9.56E-06 | 1.08E-06  |
| 21 | 0.E+00 | -2.78E-04 | -3.61E-05 | 3.23E-06  | -1.42E-07 |

Figure 14:
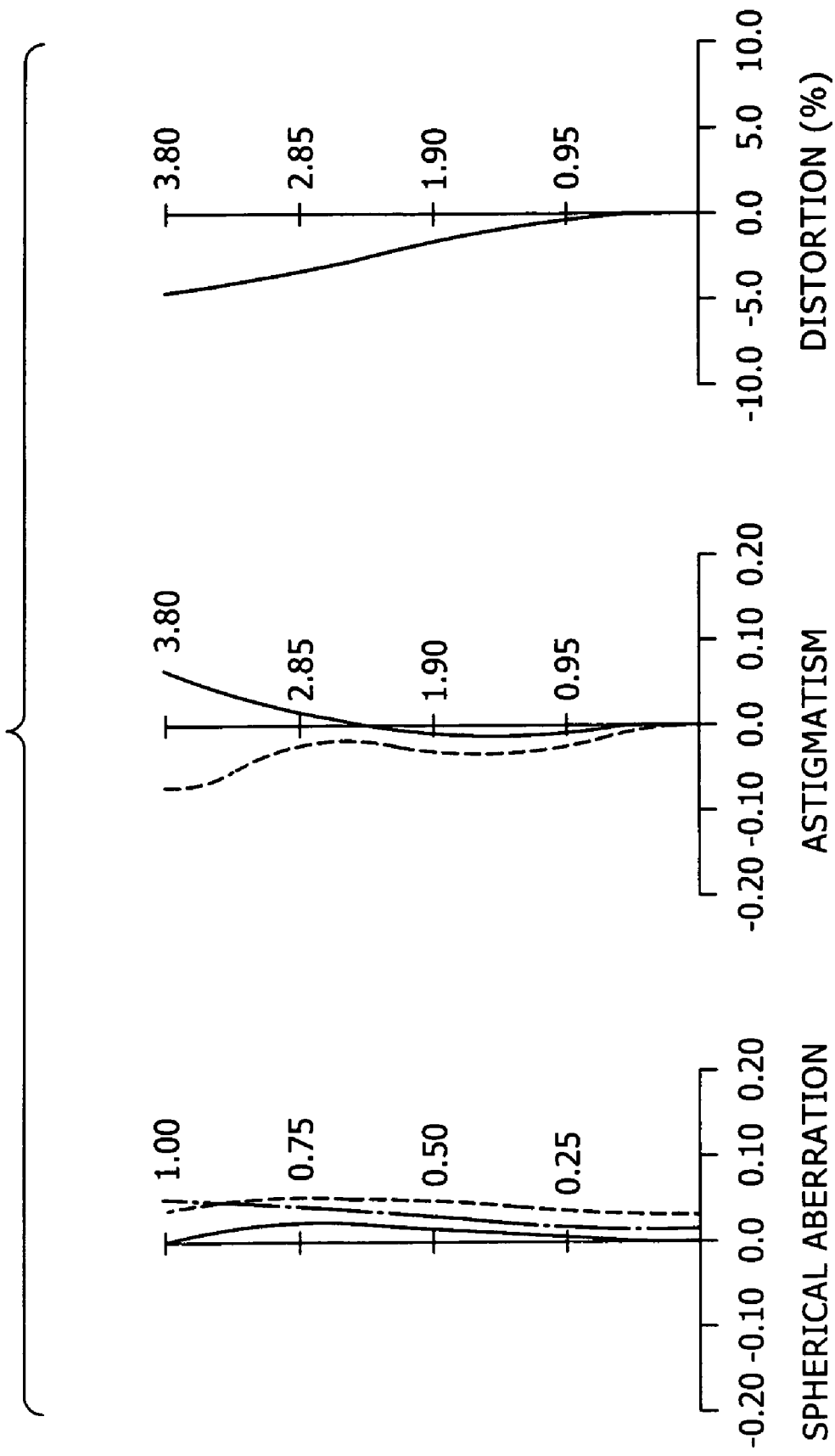
FIG. 14 is a diagram showing spherical aberration, astigmatism, and distortion values at a wide-angle end state.
Figure 15:
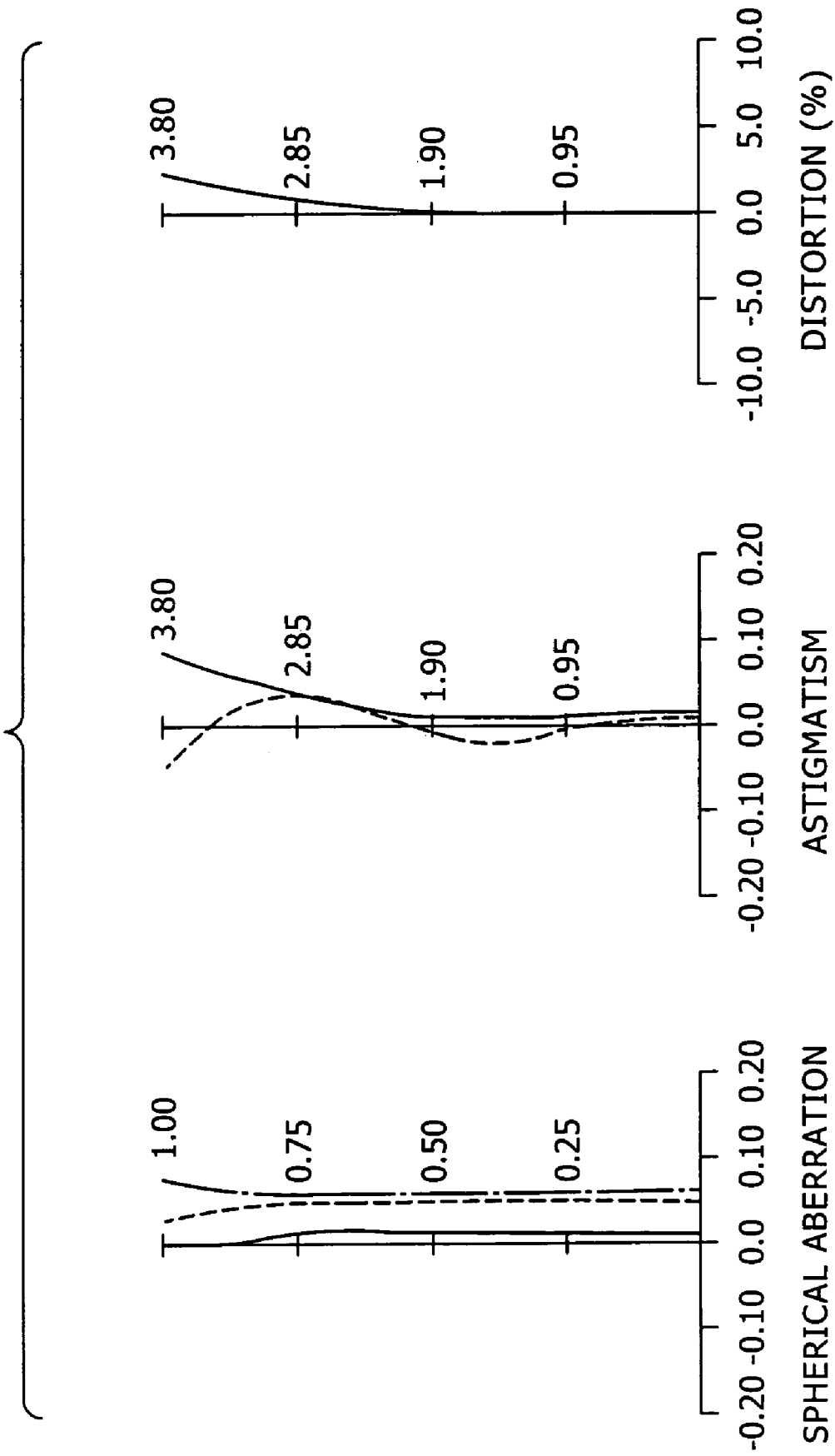
FIG. 15 is a diagram showing spherical aberration, astigmatism, and distortion values at an intermediate focal point position between a wide-angle end state and a telescopic end state.
Figure 16:
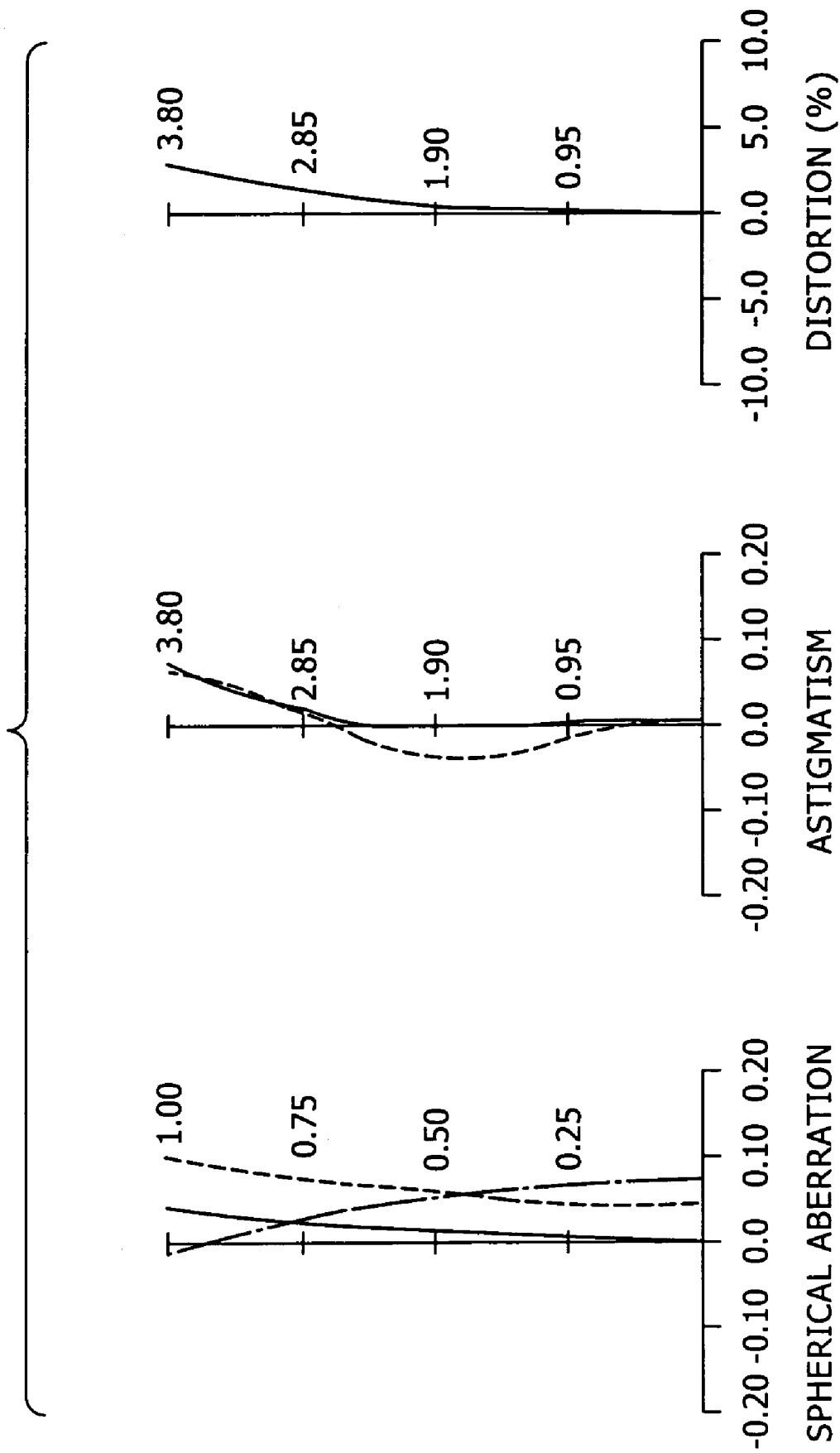
FIG. 16 is a diagram showing spherical aberration, astigmatism, and distortion values at a telescopic end state.

FIG. 14 shows spherical aberration, astigmatism, and distortion values at the wide-angle end state, FIG. 15 shows spherical aberration, astigmatism, and distortion values at the intermediate focal point position between the wide-angle end state and the telescopic end state, and FIG. 16 shows spherical aberration, astigmatism, and distortion values at the telescopic end state, all in the numerical example 4. With respect to the spherical aberration values, the vertical axis represents the ratio to the F-number at an open aperture, the horizontal axis defocus, the solid-line curve spherical aberration values at the d-line, the broken-line curve spherical aberration values at the C-line, and the dot-and-dash-line curve spherical aberration values at the g-line. With respect to the astigmatism values, the vertical axis represents the image height, the horizontal axis focus, the solid-line curve a sagittal image plane, and the broken-line curve a meridional image plane. With respect to the distortion values, the vertical axis represents the image height, and the horizontal axis %.

Table 13 shows numerical values for determining the conditions according to the conditional formulas (1) through (4) for the zoom lenses in the numerical examples 1 through 4 and also show the conditional formulas.

TABLE 13

| NUMERICAL EXAMPLE | D1/Fw | D1/Ft | NdL1 | VdAv − VdL1 |
|---|---|---|---|---|
| 1 | 1.7500 | 0.625 | 1.923 | 32.32 |
| 2 | 3.1330 | 0.448 | 1.923 | 41.77 |
| 3 | 2.1162 | 0.433 | 1.923 | 44.58 |
| 4 | 1.5538 | 0.541 | 1.923 | 28.74 |

As can be seen from the above tables (Tables 1 through 13), the zoom lenses according to the numerical examples 1 through 4 satisfy the conditional formulas (1) through (4). The zoom lenses are also corrected for the aberrations in good balance at the wide-angle end state, the intermediate focal point position between the wide-e angle and state and the telescopic end state, and the telescopic end state, as shown in the aberration diagrams.

FIG. 7 shows an image pickup apparatus according to an embodiment 1 of the present invention.

An image pickup apparatus 10 has a zoom lens 20 and an image sensing device 30 for converting an optical image generated by the zoom lens 20 into an electric signal. The image sensing device may employ a photoelectric transducer such as a CCD (Charged Coupled Device) or a CMOS (Complementary Metal-Oxide Semiconductor) device. The zoom lens 20 may include a zoom lens according to the present invention. In FIG. 17, the zoom lens 1 according to the first embodiment shown in FIG. 1 is simplified such that each of the lens groups except the first lens group GR1 is illustrated as a single lens. The image pickup apparatus may employ not only the zoom lens according to the first embodiment, but also each of the zoom lenses 2 through 4 according to the second through fourth embodiments, or a zoom lens according to the present invention which is constructed differently from the embodiments illustrated in the specification.

The electric signal generated by the image sensing device 30 is processed by a video separating circuit 40 into a focus control signal that is sent to a control circuit 50 and a video signal that is sent to a video processing circuit. The signal sent to the video processing circuit is processed into a signal suitable for subsequent processing, and supplied for use in various processes such as a display process on a display device, a recording process on a recording medium, and a transmission process on a communicating means.

The control circuit 50 is supplied with control signals from an external device, such as a control signal from a zoom button or the like, and performs various processes depending on the control signals. For example, when the control circuit 50 is supplied with a zooming command from the zoom button, the control circuit 50 controls driver circuits 51, 52 to energize actuators 51a, 52a to move the second lens group GR2 and the fourth lens group GR4 to respective given positions in order to achieve a focal length based on the zooming command. Positional information, obtained by sensors 51b, 52b, of the second lens group GR2 and the fourth lens group GR4 is input to control circuit 50, which refers to the positional information when it outputs command signals to the driver circuits 51, 52. Based on the signal from the video separating circuit 40, the control circuit 50 checks a focused state, and controls the fourth lens group GR4 through the driver circuit 52, for example, in order to achieve an optimum focused state.

The image pickup apparatus 10 described above may take any of various forms as specific products. For example, the image pickup apparatus 10 may be applied to any of various cameras including a digital still camera, a digital video camera, etc., or a camera unit of any of various digital input/output devices including a cellular phone incorporating a camera, a PDA (Personal Digital Assistant) incorporating a camera, etc.

The zoom lens according to the present invention is applicable to not only a digital camera, but also a camera which employs a silver halide film as a recording medium.

The specific configurations, structures, and numerical values of various parts illustrated in the embodiments and numerical examples described above are given by way of example only for specific arrangements to carry out the invention. The technical scope of the present invention should not be construed restrictively by those specific configurations, structures, and numerical values.

INDUSTRIAL APPLICABILITY

The present invention can be used as any of various cameras including a digital still camera, a digital video camera, etc., or a camera unit of any of various digital input/output devices including a cellular phone incorporating a camera, a PDA (Personal Digital Assistant) incorporating a camera, etc., and also as a zoom lens for use in such a camera or camera unit.

The invention claimed is:

1. A zoom lens having a first lens group fixed upon zooming and having a positive refractive power, a second lens group having a negative refractive power, a third lens group having a positive refractive power, a fourth lens group having a negative refractive power, and a fifth lens group having a positive refractive power, which are successively arranged in this order from an object side, wherein the third lens group is fixed and at least the second lens group and the fourth lens group are moved for zooming, wherein the fourth lens group moved in one linear direction when the second and fourth lens groups are moved for zooming, and wherein said first lens group comprises a first single lens having a negative refractive power, a reflective member for bending an optical path through 90°, and at least one second lens having a positive refractive power, which are successively arranged in this order from the object side.

2. The zoom lens according to claim 1, which satisfy the following conditional formulas (1), (2):

$$1.0 < D1/Fw < 5.0; \text{ and} \quad (1)$$

$$0.1 < D1/Ft < 1.0 \quad (2)$$

where

D1: the entire lens length of the first lens group;
Fw: the focal length of the entire lens system at a wide-angle end state; and
Ft: the focal length of the entire lens system at a telescopic end state.

3. The zoom lens according to claim 1, which satisfy the following conditional formulas (3), (4):

$$NdL1 > 1.75; \text{ and} \quad (3)$$

$$VdAv - VdL1 > 15 \quad (4)$$

where

NdL1: the refractive index of the first lens at the d-line;
VdL1: the Abbe number of the first lens at the d-line; and
VdAv the average of the Abbe numbers of the lenses having a positive refractive power subsequent to the second lens in the first lens group where VdAv is determined by $(\Sigma VdLi)/i$ where i represents the number of lenses having a positive refractive power subsequent to the second lens.

4. The zoom lens according to claim 2, which satisfy the following conditional formulas (3), (4):

$$NdL1 > 1.75; \text{ and} \quad (3)$$

$$VdAv - VdL1 > 15 \quad (4)$$

where
NdL1: the refractive index of the first lens at the d-line;
VdL1: the Abbe number of the first lens at the d-line; and
VdAv the average of the Abbe numbers of the lenses having a positive refractive power subsequent to the second lens in the first lens group where VdAv is determined by (ΣVdLi)/i where i represents the number of lenses having a positive refractive power subsequent to the second lens.

5. The zoom lens according to claim 1, wherein the third lens group has an iris aperture and the third lens group and the iris aperture are both fixed upon zooming.

6. The zoom lens according to claim 2, wherein the third lens group has an iris aperture and the third lens group and the iris aperture are both fixed upon zooming.

7. The zoom lens according to claim 3, wherein the third lens group has an iris aperture and the third lens group and the iris aperture are both fixed upon zooming.

8. The zoom lens according to claim 4, wherein the third lens group has an iris aperture and the third lens group and the iris aperture are both fixed upon zooming.

9. An image pickup apparatus comprising a zoom lens having a plurality of lens groups, for varying a magnifying power by changing distances between at least some of the lens groups, and a image sensing device for converting an optical image generated by said zoom lens into an electric signal, wherein said zoom lens comprises a first lens group fixed upon zooming and having a positive refractive power, a second lens group, movable for zooming, having a negative refractive power, a fixed third lens group having a positive refractive power, a fourth lens group, movable for zooming, having a negative refractive power, and a fifth lens group having a positive refractive power, which are successively arranged in this order from an object side, wherein at least the second lens group and the fourth lens group are moved for zooming, wherein the fourth lens group moves in one linear direction when the second and fourth lens groups are moved for zooming and wherein said first lens group comprises a first single lens having a negative refractive power, a reflective member for bending an optical path through 90°, and at least one second lens having a positive refractive power, which are successively arranged in this order from the object side.

10. The zoom lens of claim 1, wherein the fourth lens group moves only in a linear non-curved fashion.

11. The image pickup apparatus of claim 9, wherein the fourth lens group moves only in a linear, non-curved fashion.

* * * * *